US012288543B2

(12) United States Patent
Takasaki et al.

(10) Patent No.: US 12,288,543 B2
(45) Date of Patent: Apr. 29, 2025

(54) SOUND SOURCE DEVICE FOR ELECTRONIC MUSICAL INSTRUMENT, MUSICAL SOUND GENERATING METHOD AND ELECTRONIC MUSICAL INSTRUMENT SYSTEM

(71) Applicant: Roland Corporation, Shizuoka (JP)

(72) Inventors: Ryo Takasaki, Shizuoka (JP); Kou Imai, Shizuoka (JP); Kenji Morita, Shizuoka (JP)

(73) Assignee: Roland Corporation, Shizuoka (JP)

( * ) Notice: Subject to any disclaimer, the term of this patent is extended or adjusted under 35 U.S.C. 154(b) by 738 days.

(21) Appl. No.: 17/546,050

(22) Filed: Dec. 9, 2021

(65) Prior Publication Data

US 2022/0101823 A1 Mar. 31, 2022

Related U.S. Application Data

(63) Continuation of application No. 16/603,248, filed as application No. PCT/JP2017/015098 on Apr. 13, 2017, now Pat. No. 11,232,774.

(51) Int. Cl.

| | |
|---|---|
| ***G10H 7/00*** | (2006.01) |
| ***G10H 1/00*** | (2006.01) |
| ***G10H 1/32*** | (2006.01) |

(52) U.S. Cl.

CPC .......... *G10H 7/008* (2013.01); *G10H 1/0008* (2013.01); *G10H 1/32* (2013.01); *G10H 2210/066* (2013.01); *G10H 2240/161* (2013.01)

(58) Field of Classification Search

CPC ........ G10H 7/008; G10H 1/0008; G10H 1/32; G10H 2210/066; G10H 2240/161

USPC .......................................................... 84/609

See application file for complete search history.

(56) References Cited

U.S. PATENT DOCUMENTS

| | | | | |
|---|---|---|---|---|
| 5,262,585 A * | 11/1993 | Greene | G10H 1/0066 | 84/738 |
| 5,399,801 A * | 3/1995 | Hasebe | G10H 1/42 | 84/DIG. 12 |
| 5,434,350 A * | 7/1995 | Haney | G10H 1/32 | 84/730 |
| 5,557,057 A * | 9/1996 | Starr | G10H 1/342 | 84/646 |
| 6,169,240 B1 * | 1/2001 | Suzuki | G10H 7/008 | 704/503 |
| 7,199,301 B2 * | 4/2007 | Prittwitz | G06F 3/033 | 84/615 |
| 7,888,580 B2 * | 2/2011 | Okano | G10H 1/0066 | 84/600 |

(Continued)

FOREIGN PATENT DOCUMENTS

JP 2007328184 A * 12/2007

*Primary Examiner* — Christina M Schreiber

(74) *Attorney, Agent, or Firm* — JCIPRNET

(57) ABSTRACT

This electronic musical instrument main body device comprises an information acquisition unit and a port assignment unit. The information acquisition unit acquires, from a playing operation device connected to one connection terminal, information related to the playing operation device. The port assignment unit assigns, to the playing operation device, a virtual input port of a type corresponding to the information related to the playing operation device and acquired by the information acquisition unit.

20 Claims, 9 Drawing Sheets

(56) References Cited

U.S. PATENT DOCUMENTS

| | | | | |
|---|---|---|---|---|
| 8,865,994 | B2 * | 10/2014 | Okano | G10H 1/0066<br>84/645 |
| 8,981,199 | B2 * | 3/2015 | Loh | G10H 1/0066<br>84/645 |
| 9,472,176 | B2 * | 10/2016 | Takahashi | H04L 12/6418 |
| 9,479,888 | B2 * | 10/2016 | Wu | H04S 3/00 |
| 11,232,774 | B2 * | 1/2022 | Takasaki | G10H 7/008 |
| 11,756,519 | B2 * | 9/2023 | Takasaki | G10H 1/0058<br>84/609 |
| 2001/0021188 | A1 * | 9/2001 | Fujimori | H04L 12/2803<br>370/389 |
| 2002/0121180 | A1 * | 9/2002 | Kondo | G09B 15/04<br>84/477 R |
| 2005/0159832 | A1 * | 7/2005 | Umeo | G10H 1/0058<br>340/3.7 |
| 2007/0227342 | A1 * | 10/2007 | Ide | H04H 60/04<br>84/645 |
| 2012/0174735 | A1 * | 7/2012 | Little | G10H 1/386<br>84/613 |
| 2014/0083280 | A1 * | 3/2014 | Little | G06F 3/017<br>84/609 |
| 2018/0082606 | A1 * | 3/2018 | Jones | G09B 15/006 |
| 2020/0234683 | A1 * | 7/2020 | Takasaki | G10H 1/02 |
| 2021/0082383 | A1 * | 3/2021 | Takasaki | G10H 1/183 |
| 2022/0101822 | A1 * | 3/2022 | Takasaki | G10H 1/0008 |
| 2022/0101823 | A1 * | 3/2022 | Takasaki | G10H 1/0008 |
| 2023/0360622 | A1 * | 11/2023 | Takasaki | G10H 1/0008 |
| 2024/0185821 | A1 * | 6/2024 | Takasaki | G10H 1/0058 |

* cited by examiner

24a

| Index (24a1) | ID (24a2) | Assigned port (24a3) | Connection flag (24a4) | Parameter (24a5) |
|---|---|---|---|---|
| 0 | A | SNARE | 1 | PA[A], XDS[A] |
| 1 | B | RIDE | 1 | PA[B], CS[B], BG[B] |
| 2 | ⋮ | ⋮ | ⋮ | ⋮ |
| 3 | C | TOM1 | 0 | PA[C], XDS[C] |
| ⋮ | ⋮ | ⋮ | ⋮ | ⋮ |
| 13 | null | −1 | 0 | null |

FIG. 4(a)

24b

| Port (24b1) | Tone (24b2) |
|---|---|
| KICK | XXXXK |
| SNARE | AAAAS |
| TOM1 | AAAAδ |
| ⋮ | ⋮ |
| RIDE | BBBR |
| ⋮ | ⋮ |
| AUX4 | YYY |

FIG. 4(b)

24c

| Port (24c1) | Model number (24c2) | Parameter (24c3) | Mute flag (24c4) |
|---|---|---|---|
| KICK | K−10 | PA[K] | 0 |
| SNARE | S−11 | PA[S], XDS[S] | 1 |
| TOM1 | T−12 | PA[T1], XDS[T1] | 0 |
| ⋮ | ⋮ | ⋮ | ⋮ |
| RIDE | R−13 | PA[R], CS[R], BG[R] | 1 |
| ⋮ | ⋮ | ⋮ | ⋮ |
| AUX4 | A−14 | PA[A4] | 0 |

FIG. 4(c)

SOUND SOURCE DEVICE FOR ELECTRONIC MUSICAL INSTRUMENT, MUSICAL SOUND GENERATING METHOD AND ELECTRONIC MUSICAL INSTRUMENT SYSTEM

CROSS-REFERENCE TO RELATED APPLICATION

This application is a continuation application of and claims the priority benefit of a prior application Ser. No. 16/603,248, filed on Oct. 7, 2019, now allowed. The prior application is a 371 application of the International PCT application serial no. PCT/JP2017/015098, filed on Apr. 13, 2017. The entirety of the above-mentioned patent application is hereby incorporated by reference herein and made a part of this specification.

TECHNICAL FIELD

The present invention relates to an electronic musical instrument main body device configuring an electronic musical instrument system by being connected to a playing operation device generating playing information and the electronic musical instrument system.

BACKGROUND ART

There are sound source devices configuring an electronic drum system by being connected to a pad that outputs a signal based on a vibration of a beating surface that has been beaten. A sound source device generates a musical sound signal having a tone assigned to a pad on the basis of a signal output from the pad.

In a conventional electronic drum system, for example, a signal output from a pad is only a signal representing a vibration intensity of a beating surface. In such an electronic drum system, a type of a connected pad cannot be automatically identified by a sound source device. For this reason, a sound source device of this electronic drum system assigns a tone to a pad in accordance with a connection terminal to which the pad is connected among a plurality of connection terminals (input ports) disposed in the sound source device. Accordingly, in a case in which assignment of a tone to a pad needs to be changed, a connection terminal connecting the pad is changed to another connection terminal, or a user operates an operator of the sound source device, whereby a setting of a tone assigned to the connection terminal is changed. Accordingly, there is forced to be a large burden on the user.

Meanwhile, among electronic drum systems of recent years, there are electronic drum systems automatically assigning a tone to a pad when the pad is connected to a sound source device. As a method of the assignment thereof, in Patent Literature 1, it is disclosed that a sound source device sets a tone corresponding to device information on the basis of the device information, which represents a type of playing operation device, transmitted from the playing operation device.

CITATION LIST

Patent Literature

[Patent Literature 1]
Japanese Patent No. 4572874

SUMMARY OF INVENTION

Technical Problem

However, in Patent Literature 1, since a tone is directly assigned to a pad, the degree of freedom of setting a tone is low, and there is a concern that it may be difficult for a user who is accustomed to a conventional electronic drum system, in which a tone is assigned to a connection terminal, to intuitively ascertain the setting.

The present invention is realized in consideration of such situations, and an objective thereof is to provide an electronic musical instrument main body device capable of increasing the degree of freedom of setting of a tone to a connected playing operation device and performing the assignment of a tone such that it can be easily understood by a user.

Solution to Problem

In order to achieve this objective, an electronic musical instrument main body device according to the present invention configures an electronic musical instrument system by being connected to a playing operation device generating playing information. In addition, an electronic musical instrument system according to the present invention includes a playing operation device that generates playing information and an electronic musical instrument main body device to which the playing operation device is connected. The electronic musical instrument main body device includes: a plurality of physical connection terminals; a tone assigning unit; a connection detecting unit; an information acquiring unit; a port assigning unit; and a musical sound generating unit. The playing operation device is connected to the plurality of physical connection terminals. In the electronic musical instrument main body device, virtual input ports are provided separately from the connection terminals for each type of playing operation device, and the tone assigning unit, to each input port, assigns a tone of a sound generated on the basis of playing information input to the input port. The connection detecting unit detects that the playing operation device is connected to one of the connection terminals. The information acquiring unit, in a case in which it is detected by the connection detecting unit that the playing operation device is connected to one of the connection terminals, acquires information relating to the playing operation device from the connected playing operation device. The port assigning unit assigns the virtual input port of a type corresponding to the information relating to the playing operation device acquired by the information acquiring unit to the playing operation device of which the connection with the one of the connection terminals is detected by the connection detecting unit. The musical sound generating unit generates a musical sound signal of a tone assigned by the tone assigning unit to the virtual input port assigned to the playing operation device by the port assigning unit on the basis of the playing information acquired from the playing operation device connected to the connection terminal.

Effects of Invention

According to an electronic musical instrument main body device of the present invention, virtual input ports are provided for each type of playing operation device separately from a plurality of physical connection terminals to which the playing operation device is connected, and, to each input port, a tone of a sound generated on the basis of playing information input to the input port is assigned by the tone assigning unit. In a case in which it is detected by the connection detecting unit that the playing operation device is connected to one of the connection terminals, information relating to the playing operation device is acquired by the information acquiring unit from the connected playing operation device. Then, a virtual input port of a type corresponding to the information relating to the playing operation device acquired by the information acquiring unit is assigned by the port assigning unit to the playing operation device of which connection with one of connection terminals has been detected by the connection detecting unit. When playing information is acquired from the playing operation device connected to the connection terminal, a musical sound signal of a tone assigned by the tone assigning unit to the virtual input port assigned to the playing operation device by the port assigning unit is generated by the musical sound generating unit on the basis of the playing information. Accordingly, a degree of freedom of tone setting for a playing operation device connected to an electronic musical instrument main body device can be increased, and there is an effect of being capable of performing assignment of a tone such that it can be easily understood by a user.

BRIEF DESCRIPTION OF DRAWINGS

FIG. 4(*a*) is a schematic diagram schematically illustrating one example of details of a digital pad assignment table, FIG. 4(*b*) is a schematic diagram schematically illustrating one example of details of a port-tone correspondence table, and FIG. 4(*c*) is a schematic diagram schematically illustrating one example of details of an analog pad parameter table.

DESCRIPTION OF EMBODIMENTS

Figure 1:
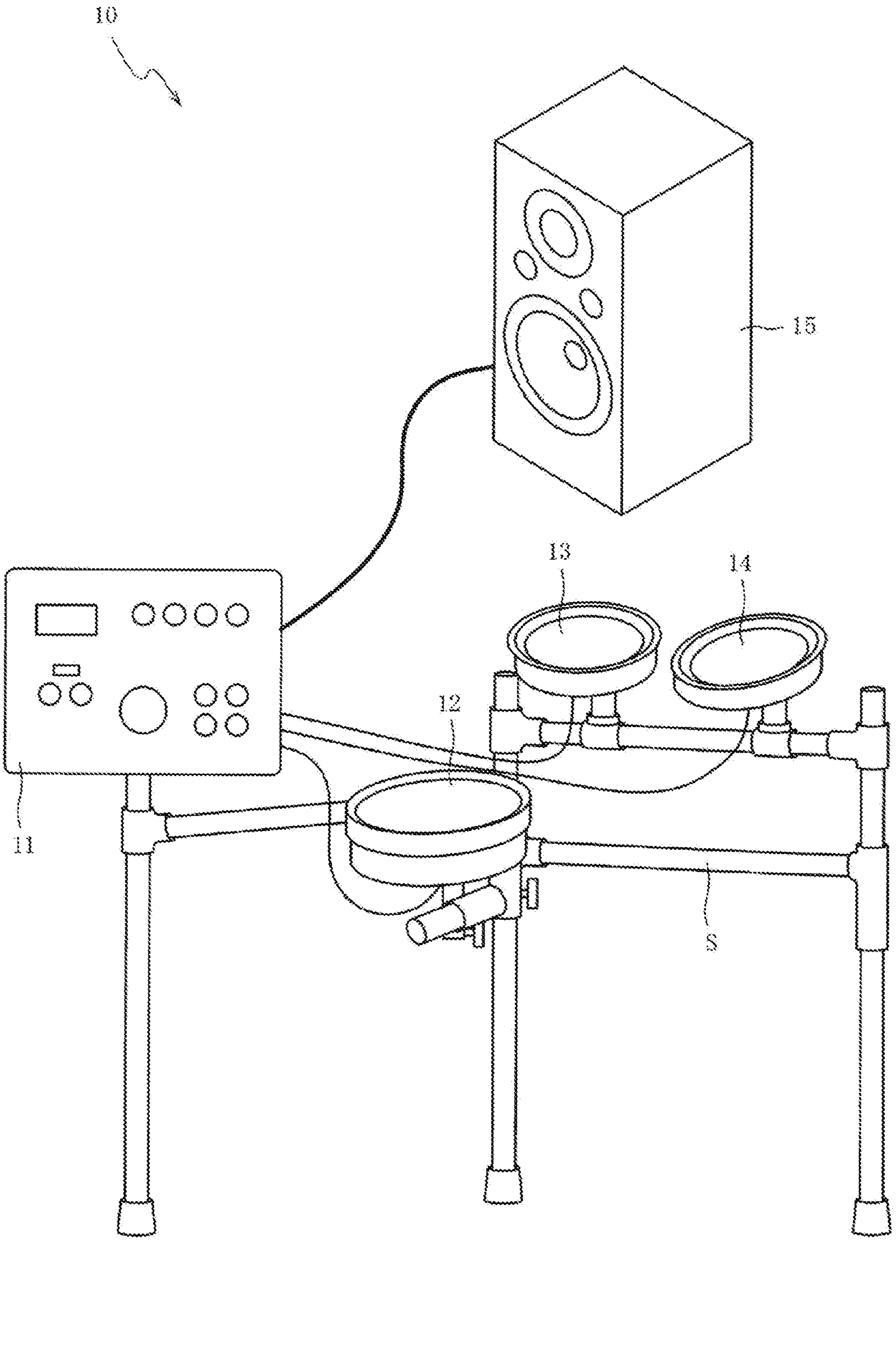
FIG. 1 is a schematic diagram illustrating an image of an entire electronic drum system including a sound source device according to one embodiment of the present invention.
Figure 2:
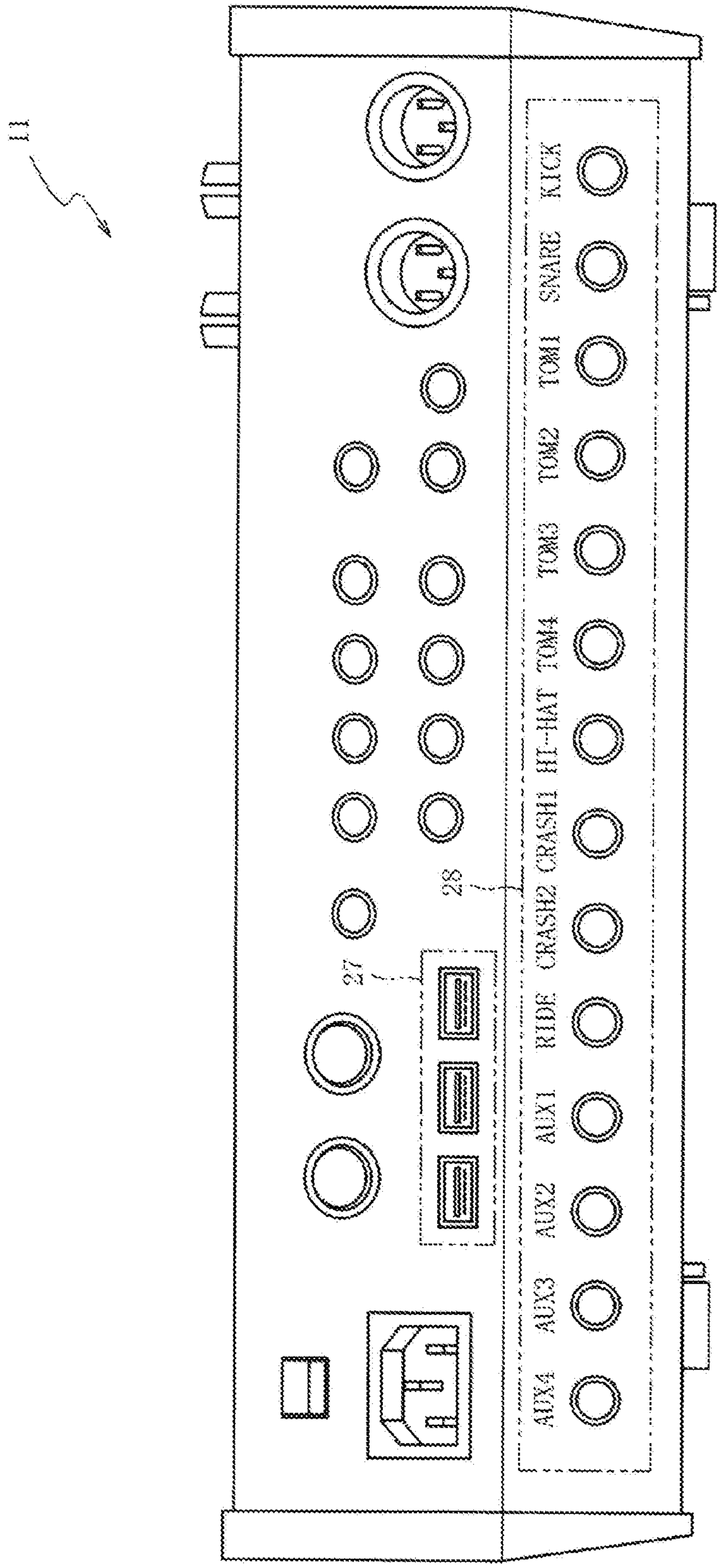
FIG. 2 is a schematic diagram schematically illustrating a rear panel disposed on a rear-face side of a sound source device.

Hereinafter, embodiments of the present invention will be described with reference to the attached drawings. First, a sound source device 11 according to one embodiment of the present invention and an electronic drum system 10 including the sound source device 11 will be described with reference to FIGS. 1 and 2. FIG. 1 is a schematic diagram illustrating an image of the entire electronic drum system 10, and FIG. 2 is a schematic diagram schematically illustrating a rear panel disposed on a rear-face side of the sound source device 11.

As illustrated in FIG. 1, the electronic drum system 10 is composed of pads (in the example illustrated in FIG. 1, pads 12, 13, and 14) and a built-in amplifier speaker 15 in addition to the sound source device 11. The pads and the sound source device 11 are installed in a stand S and are built as one electronic drum system 10.

The pads 12 to 14 and the built-in amplifier speaker 15 are electrically connected to the sound source device 11. In the electronic drum system 10, a user beats each of the pads 12 to 14 as if playing an acoustic drum, whereby musical sounds of tones assigned to the pads are generated from the built-in amplifier speaker 15 by performing electric processing using the sound source device 11.

The sound source device 11 is a device that has sound source data corresponding to each tone and generates a musical sound signal of a musical sound that is generated from the built-in amplifier speaker 15 with a tone corresponding to a pad in accordance with playing information such as sound generation instruction information received from the pad being beaten.

Each of pads including the pads 12 to 14 that can be connected to the sound source device 11 has a beating surface respectively and generates playing information on the basis of a vibration of the beating surface that is generated in accordance with a beat on the beating surface. There are types of pad such as a base drum, a snare drum, toms, a ride cymbal, a crash cymbal, a hi-hat cymbal, and the like.

Here, two types of pad, when roughly classified in accordance with a method of transmitting playing information, can be connected to the sound source device 11. One type of pad generates sound generation instruction information of a digital signal from a vibration of a beat for the beating surface as playing information and outputs the generated sound generation instruction information to the sound source device 11. Hereinafter, this type of pad will be referred to as a digital connection type pad.

As illustrated in FIG. 2, a USB interface (hereinafter, referred to as a "USB I/F") 27 (see FIG. 3) having three USB connectors that are in compliance with USB (universal serial bus) standards are disposed in a rear panel of the sound source device 11. The sound source device 11 is configured to be able to connect to a maximum of three digital connection-type pads through USB cables. A digital connection-type pad can be connected to an arbitrary USB connector of the sound source device 11 regardless of the type thereof (a type such as a base drum, a snare drum, or the like). The sound source device 11 assigns a virtual input port corresponding to a type of pad to the digital connection-type pad connected to an arbitrary USB connector and handles the digital connection-type pad as being connected to the assigned virtual input port. In addition, the sound source device 11 assigns a tone to each virtual input port. When playing information is acquired from a pad to which one virtual input port is assigned, the sound source device 11 generates a musical sound with a tone that has been assigned to the one virtual input port. Details of a virtual input port will be described later with reference to FIG. 5.

Another type of pad generates an analog signal representing a vibration level of a beat for a beating surface as playing information (corresponding to second playing information according to the present invention) and outputs the generated analog signal to the sound source device 11. Hereinafter, this type of pad will be referred to as an analog connection-type pad.

In the rear panel of the sound source device 11, as illustrated in FIG. 2, an input port 28 (see FIG. 3) having input ports (connection terminals) used for connection to analog connection-type pads for each type of pad is disposed. More specifically, in the input port 28, 14 physical input ports including a KICK input port used for connection of a base drum, a SNARE input port used for connection of a snare drum, a TOM1 input port, a TOM2 input port, a TOM3 input port, and a TOM4 input port used for connection of toms, a HI-HAT input port used for connection of a hi-hat cymbal, a CRASH1 input port and a CRASH2 input port used for connection of crash cymbals, a RIDE input port used for connection of a ride cymbal, and an AUX1 input port, an AUX2 input port, an AUX3 input port, and an AUX4 input port used for connection of other types of pads are provided.

In the sound source device 11, a corresponding tone is assigned to each input port. The assignment of a tone can be changed by a user operating the sound source device 11. In a case in which a pad is connected to one input port, a musical sound having a tone assigned to the input port is generated. For example, a tone used for a base drum is assigned to the KICK input port. On the basis of playing information acquired from a pad connected to the KICK input port, the sound source device 11 generates a musical sound having a tone used for a base drum assigned to the KICK input port. In a case in which a tone of a musical sound generated on the basis of a pad connected to the KICK input port needs to be changed, it is necessary to change the input port connecting the pad from the KICK input port to another input port or for a user to change a tone assigned to the KICK input port to another tone by operating the sound source device 11.

Figure 3:
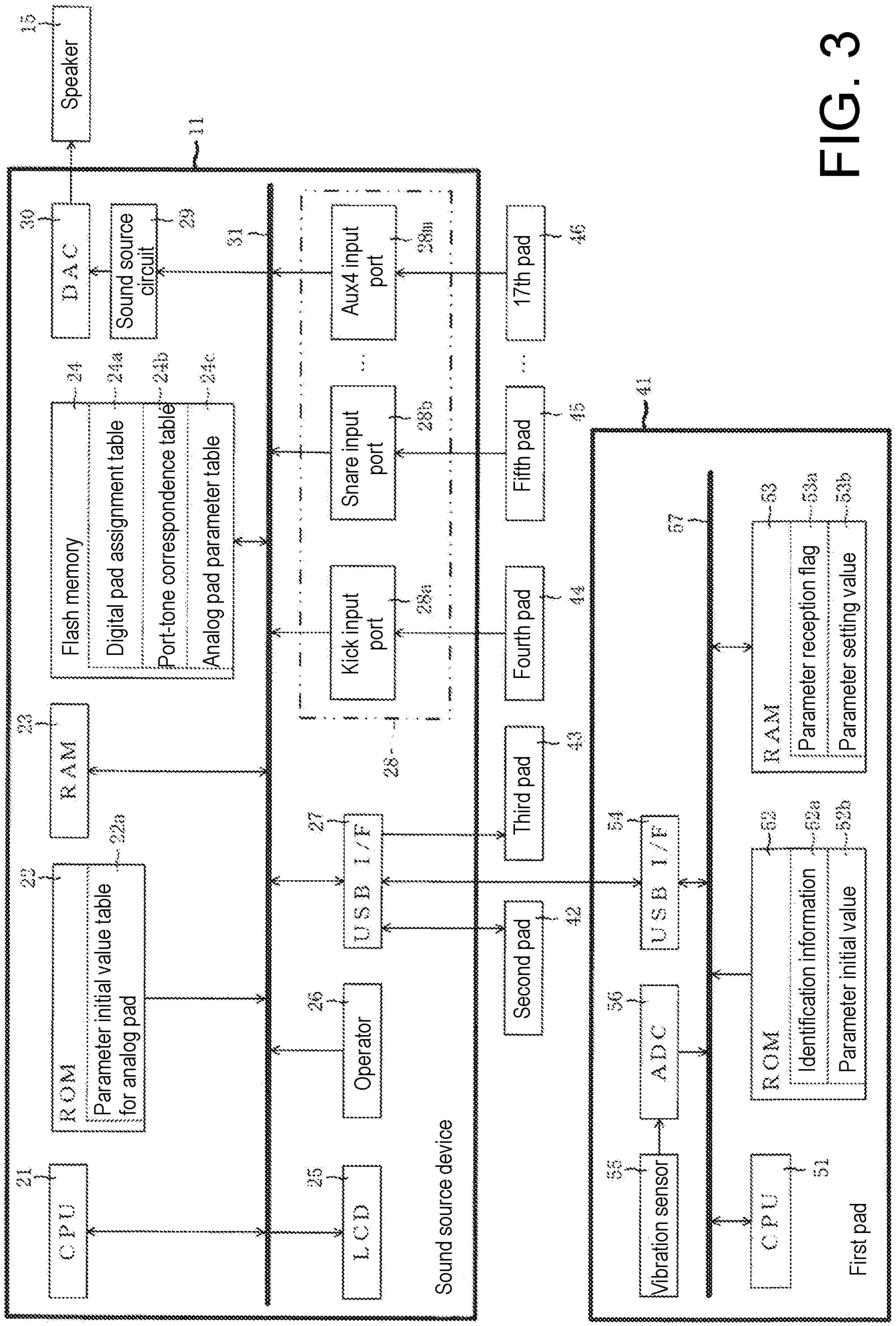
FIG. 3 is a block diagram illustrating the electric configuration of a sound source device and a pad.

Hereinafter, the electric configuration of the sound source device 11 and each of pads (a first pad 41 and the like) connected to the sound source device 11 will be described with reference to FIG. 3. FIG. 3 is a block diagram illustrating the electric configuration of the sound source device 11 and each pad.

First, a first pad 41 that is one digital connection-type pad will be described. In addition, a second pad 42 and a third pad 43 have the same configuration as that of the first pad 41, and thus, description thereof will be omitted here.

The first pad 41 includes a central processing unit (CPU) 51, a read only memory (ROM) 52, a random access memory (RAM) 53, a USB I/F 54, a vibration sensor 55, and an analog-to-digital converter (hereinafter, referred to as an "ADC") 56.

Output sides of the CPU 51, the ROM 52, the RAM 53, the USB I/F 54, and the ADC 56 are interconnected through a bus line 57. An input side of the ADC 56 is connected to the vibration sensor 55.

The CPU 51 is a device that performs various control operations and arithmetic operations on the basis of a program and fixed-value data stored in the ROM 52, information stored in the RAM 53, and the like. The ROM 52 is a non-rewritable nonvolatile memory used for storing a program executed by the CPU 51 and fixed-value data. The RAM 53 is a rewritable volatile memory used for temporarily storing information used for arithmetic operations performed by the CPU 51 and information of results of arithmetic operations.

In the ROM 52, at least identification information 52*a* and parameter initial values 52*b* are stored as fixed-value data.

The identification information 52*a* is information used for identifying a pad and includes individual information that is a unique identification (ID) of a pad individually assigned to each pad, model information representing a model number of the pad, and type information representing a type (a base drum, a snare drum, or the like) of the pad. This identification information 52*a* is stored in the ROM 52 at the time of manufacturing the first pad 41 and can be incorporated into the first pad 41.

The identification information 52*a* is transmitted to the sound source device 11 in response to a request from the sound source device 11. The sound source device 11 performs assignment of a virtual input port to this pad, management of the assigned virtual input port, and the like using this identification information 52*a*.

In addition, this identification information 52*a* may be included in a descriptor that is information used for realizing Plug & Play of the USB standards. In such a case, in response to a request for a descriptor transmitted from the sound source device 11 to the first pad 41 in a case in which connection of the first pad 41 is detected by the sound source device 11, the first pad 41 transmits a descriptor to the sound source device 11, and the identification information 52*a* is included in the descriptor. The sound source device 11 extracts the identification information 52*a* from this descriptor and performs assignment of a virtual input port to the first pad 41, management of the assigned virtual input port, and the like.

On the other hand, the identification information 52*a* may be stored in the ROM 52 additionally to the descriptor. In such a case, after acquiring a descriptor of the first pad 41 that has been requested to be transmitted on the basis of detection of connection of the first pad 41 and setting up communication with the first pad 41, the sound source device 11 may individually transmit a request for transmitting the identification information 52*a* to the first pad 41. In such a case, the first pad 41 transmits the identification information 52*a* to the sound source device 11 on the basis of a request for transmission of the individual identification information 52*a*. Hereinafter, in this embodiment, a case in which the identification information 52*a* is stored in the ROM 52 in addition to a descriptor will be described as an example.

The parameter initial values 52*b* are initial values of parameters relating to an operation of the first pad 41. As these parameters, for example, there are various parameters such as a position adjust (PA) that is a parameter for adjusting a change in the tone for a beat position on a beating surface, a cross stick detect sense (XDS) that is a parameter for adjusting easiness in appearance of a cross stick playing method, a choke sense (CS) that is a parameter for adjusting a sensitivity of a choke playing method, a bell gain (BG) that is a parameter for adjusting an intensity of a beat on a bell and balance of magnitudes of sounds in a bell shot playing method, and the like. Initial values of parameters required in accordance with characteristics of pads among them are stored in the ROM 52 as parameter initial values 52*b*.

The parameter initial values 52*b* are transmitted to the sound source device 11 in response to a request from the sound source device 11. In the sound source device 11, values of parameters relating to operations of connected pads are configured to be changed by a user. In a case in which a value of a parameter relating to an operation of a digital connection-type pad is changed by the sound source device 11, the sound source device 11 transmits the parameter after change to a pad using the changed parameter. When a parameter after change is received from the sound source device 11, thereafter, the digital connection-type pad operates using the received parameter after change. In this way, the sound source device 11 is enabled to change parameters relating to an operation of a digital connection-type pad, and the change can be reflected in the digital connection-type pad. In a state in which parameters after change have not been received from the sound source device 11, the digital connection-type pad operates using the parameter initial values 52*b*.

Subsequently, the RAM 53 is configured to store at least a parameter reception flag 53*a* and parameter setting values 53*b*. The parameter reception flag 53*a* is a flag indicating that the first pad 41 has received parameters after change from the sound source device 11. The parameter setting values 53*b* are values of parameters after change that have been received from the sound source device 11.

In a case in which the value of the parameter reception flag 53*a* is "1", it represents that parameters after change have been received from the sound source device 11. In a case in which the value of the parameter reception flag 53*a* is "0", it represents that parameters after change have not been received from the sound source device 11. By connecting the first pad 41 to the sound source device 11, in a case in which power is supplied to the first pad 41, the parameter reception flag 53*a* is initialized to "0" in a starting process using a CPU 51. Then, when parameters after change are received from the sound source device 11, in accordance with the process of the CPU 51, values of the received parameters after change are stored in the RAM 53 as parameter setting values 53*b*, and the parameter reception flag 53*a* is set to "1".

In a case in which the parameter reception flag 53*a* is "0", the first pad 41 operates using the parameter initial values 52*b*. On the other hand, in a case in which the parameter reception flag 53*a* is "1", the first pad 41 operates using the parameter setting values 53*b*.

The USB I/F 54 is an interface that controls communication with other devices in compliance with USB standards. When connected to the sound source device 11 through a USB cable, the first pad 41 can communicate with the sound source device 11 using this USB I/F 54.

The vibration sensor 55 is a sensor that senses a vibration of the beating surface of the first pad 41 and outputs an analog signal representing a vibration level thereof. The ADC 56 is a converter that converts an analog signal output from the vibration sensor 55 into a digital signal. The CPU 51 determines a vibration level of the beating surface of the first pad 41 output from the ADC 56 and generates sound generation instruction information used for causing the sound source device 11 to generate a musical sound on the basis of the vibration level. The sound source device 11 generates a musical sound signal on the basis of the sound generation instruction information and generates a musical sound from the built-in amplifier speaker 15.

A fourth pad 44, a fifth pad 45, . . . , a 17-th pad 46 are analog connection-type pads. In such a pad (analog connection-type pad), a vibration sensor not illustrated in the drawing is disposed. A vibration of the beating surface disposed in each pad is detected by the vibration sensor, and an analog signal representing a vibration level thereof is output from each pad. The sound source device 11 receives an analog signal representing this vibration level from an analog connection-type pad connected to the input port 28 and converts the received analog signal into a digital signal using an ADC (not illustrated in the drawing) built into the sound source device 11. The sound source device 11 analyzes the vibration level converted into the digital signal using the CPU 21. Then, the sound source device 11 generates a musical sound signal on the basis of the vibration level and generates a musical sound from the built-in amplifier speaker 15.

Here, as described above, corresponding tones are assigned to each of the input ports 28*a* to 28*m* of the sound source device 11. The tones of the fourth pad 44, the fifth pad 45, . . . , the 17-th pad 46 are tones that are assigned to the connected input ports 28*a* to 28*m*. In other words, in the case of being connected to the KICK input port 28*a*, the fourth pad 44 generates a musical sound with a tone assigned to the KICK input port 28*a*. In the case of being connected to the SNARE input port 28*b*, the fifth pad 45 generates a musical sound with a tone assigned to the SNARE input port 28*b*. In addition, in the case of being connected to the AUX4 input port 28*m*, the 17-th pad 46 generates a musical sound with a tone assigned to the AUX4 input port 28*m*.

Next, the sound source device 11 will be described. The sound source device 11 includes a CPU 21, a ROM 22, a RAM 23, a flash memory 24, a liquid crystal display (LCD) 25, an operator 26, a USB I/F 27 (see FIG. 2), an input port 28 (see FIG. 2), a sound source circuit 29, and a digital-to-analog converter (hereinafter, referred to as a "DAC") 30. The CPU 21, the ROM 22, the RAM 23, the flash memory 24, the LCD 25, the operator 26, the USB I/F 27, the input port 28, and the sound source circuit 29 are interconnected through a bus line 31. In addition, the sound source circuit 29 is connected to an input side of the DAC 30, and the built-in amplifier speaker 15 is connected to an output side of the DAC 30.

The CPU 21 is a device that performs various control operations and arithmetic operations on the basis of a program and fixed-value data stored in the ROM 22, information stored in the RAM 23, and the like. The ROM 22 is a non-rewritable nonvolatile memory used for storing a program executed by the CPU 21 and fixed-value data. The RAM 23 is a rewritable volatile memory used for temporarily storing various kinds of data and the like when various control operations and arithmetic operations performed by the CPU 21 are executed.

In the ROM 22, at least a parameter initial value table 22*a* for an analog pad is stored. The parameter initial value table 22*a* for an analog pad is a table that represents initial values of parameters relating to operation of pads for each model for all the analog connection-type pads planned to be connected to the sound source device 11.

In a case in which one analog connection-type pad is connected to the input port 28 of the sound source device 11, a user needs to set parameters required for operating the pad in the sound source device 11. However, inputting of the parameters one by one increases a user's burden. The user selects a model of a connected analog connection-type pad among models of analog connection-type pads registered in the sound source device 11 in advance. Accordingly, initial values of parameters corresponding to the model are read from the parameter initial value table 22*a* for an analog pad, and the initial values are set as parameters relating to an operation of the analog connection-type pad. Thus, the user can easily set parameters relating to the operation of the analog connection-type pad.

The flash memory 24 is a rewritable nonvolatile memory used for storing information used for arithmetic operations of the CPU 21. In other words, information stored in the flash memory 24 can be rewritten and can be maintained also for a period in which the power of the sound source device 11 is off. In the flash memory 24, at least a digital pad assignment table 24*a*, a port-tone correspondence table 24*b*, and an analog pad parameter table 24*c* are stored.

First, details of the digital pad assignment table 24*a* will be described with reference to FIG. 4(*a*). FIG. 4(*a*) is a schematic diagram schematically illustrating one example of details of the digital pad assignment table 24*a*. This digital pad assignment table 24*a* is a table that is used for storing virtual input ports, which will be described later, assigned to digital connection-type pads (for example, the first pad 41 to the third pad 43) connected through the USB I/F 27 in a maximum of 14 digital connection-type pads.

The digital pad assignment table 24*a* is composed of an index area 24*a*1, an ID area 24*a*2, an assignment port area 24*a*3, a connection flag area 24*a*4, and a parameter area 24*a*5. The index area 24*a*1 is an area in which an index number is stored. The index number is a number used for identifying one element (digital connection-type pad) in an array that is provided for storing virtual input ports assigned to a maximum of 14 digital connection-type pads for each digital connection type pad.

Integers acquired by sequential increase of one each time from 0 to 13 are stored as index numbers in the index area 24*a*1 in advance in a manufacturing stage of the sound source device 11 and, thereafter, continue to be maintained without being rewritten. The sound source device 11 stores and manages virtual input ports assigned to a maximum of 14 digital connection-type pads using these index numbers.

The ID area 24*a*2 is an area in which individual information used for identifying a digital connection-type pad that is stored in association with an index number stored in the index area 24*a*1 is stored. As the individual information stored in the ID area 24*a*2, individual information included in identification information 52*a* acquired from a digital connection-type pad in a case in which the digital connection-type pad is connected is used. As described above, this individual information is a unique ID of a pad that is individually assigned to each pad. Accordingly, a digital connection-type pad stored in association with an index number can be identified from the individual information stored in the ID area 24*a*2.

Figure 5:
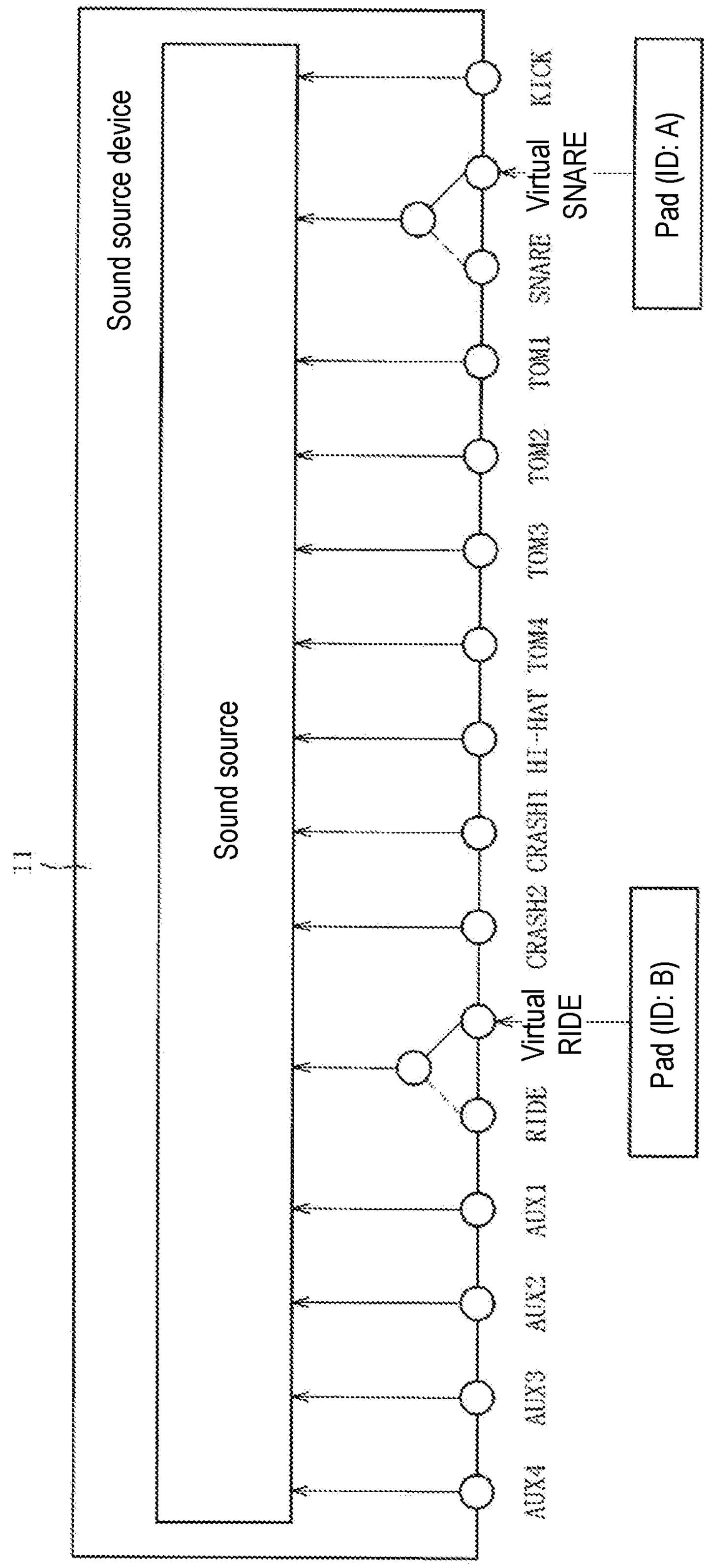
FIG. 5 is a schematic diagram schematically illustrating input ports disposed in a sound source device.

The assignment port area 24*a*3 is an area that is used for storing a virtual input port assigned to a digital connection-type pad stored in association with an index number of the index area 24*a*1. Here, a virtual input port will be described with reference to FIG. 5. FIG. 5 is a schematic diagram schematically illustrating input ports disposed in the sound source device 11.

As described above with reference to FIG. 2, in the sound source device 11, as input ports 28 used for connecting analog connection-type pads, 14 physical input ports KICK, SNARE, TOM1, TOM2, TOM3, TOM4, HI-HAT, CRASH1, CRASH2, RIDE, AUX1, AUX2, AUX3, and AUX4 are provided.

On the other hand, in the sound source device 11, three USB connector are provided as connection terminals used for connecting digital connection-type pads. At this time, a digital connection-type pad can be connected to an arbitrary USB connector regardless of a type of the pad (a type such as a base drum, a snare drum, or the like).

Here, in this sound source device 11, a concept of a virtual input port is introduced. More specifically, the sound source device 11 introduces 14 virtual input ports to which digital connection-type pads are connected in accordance with 14 physical input ports to which analog connection-type pads are connected. In other words, as virtual input ports, a virtual KICK, a virtual SNARE, a virtual TOM1, a virtual TOM2, a virtual TOM3, a virtual TOM4, a virtual HI-HAT, a virtual CRASH1, a virtual CRASH2, a virtual RIDE, a virtual AUX1, a virtual AUX2, a virtual AUX3, and a virtual AUX4 are provided.

The same tone as that of a corresponding physical input port is assigned to each virtual input port. For example, the same tone as that of a physical KICK input port is assigned to a virtual KICK input port, and the same tone as that of a physical SNARE input port is assigned to a virtual SNARE input port.

When detecting that a digital connection-type pad is connected, the sound source device 11 acquires the identification information 52*a* from the digital connection-type pad. On the basis of the model information (information representing a model number) and the type information (information representing a type of pad such as a base drum, a snare drum, or the like) included in the identification information 52*a*, a virtual input port that is appropriate for the type of the digital connection-type pad is assigned.

For example, in a case in which a digital connection-type pad of which individual information (ID) is "A" is a snare drum, a virtual SNARE input port is assigned to the pad (ID: A). In addition, in a case in which a digital connection-type pad of which individual information (ID) is "B" is a ride cymbal, a virtual RIDE input port is assigned to the pad (ID: B).

Accordingly, a digital connection-type pad connected to the sound source device 11 is in a state of virtually being connected to a virtual input port of that type. Then, the sound source device 11 can generate a musical sound signal with a tone assigned to the virtual input port on the basis of playing information output from the digital connection-type pad. In other words, a tone according to a type of pad can be assigned to the digital connection-type pad.

In this way, the sound source device 11 assigns a virtual input port to a digital connection-type pad instead of directly assigning a tone thereto. Here, a conventional sound source device corresponding to only an analog connection-type pad generates a sound based on the analog connection-type pad with a tone assigned to an input port to which the analog connection-type pad is connected. The sound source device 11 also assigns a virtual input port to a digital connection-type pad and generates a sound with a tone assigned to the virtual input port. Accordingly, the sound source device 11 can increase a degree of freedom of tone setting for a connected digital connection-type pad and can perform assignment of a tone such that it can be easily understood by a user.

In addition, in a case in which one digital connection-type pad is virtually connected to one virtual input port, the sound source device 11 does not assign another digital connection-type pad to that one virtual input port. Accordingly, even in a case in which another digital connection-type pad of the same type as that of one digital connection-type pad is connected to the sound source device 11, a virtual input port connected to one digital connection-type pad being assigned to another digital connection-type pad can be avoided. Accordingly, the same tone as that of one digital connection-type pad being assigned to another digital connection-type pad can be inhibited.

On the other hand, in a case in which another digital connection-type pad of the same type as that of one digital connection-type pad is connected to the sound source device 11, the sound source device 11 assigns a virtual input port desired by a user among virtual input ports to which no pad is connected to the another digital connection-type pad. At this time, the sound source device 11 displays a screen prompting a user to input a desired virtual input port on the LCD 25. A user can set a virtual input port assigned to the another digital connection-type pad by operating the operator 26. In this way, in a case in which another digital connection-type pad of the same type as that of one digital connection-type pad is connected to the sound source device 11, an input port set by a user can be assigned to the another digital connection-type pad. Accordingly, a musical sound having a tone desired by a user can be generated using the another digital connection-type pad.

In addition, in a case in which a digital connection-type pad is in the state of being virtually connected to a virtual input port, even when an analog connection-type pad is connected to a physical input port corresponding to the virtual input port, this sound source device 11 is configured to cause the generation of a musical sound based on the analog connection-type pad to be mute. For example, in a case in which a digital connection-type pad is virtually connected to a virtual SNARE input port, even when the fifth pad 45 is connected to the SNARE input port 28*b* (see FIG. 2), generation of a musical sound based on the fifth pad 45 becomes mute. Accordingly, in a case in which a digital connection-type pad and an analog connection-type pad of the same type are connected to the sound source device 11, the digital connection-type pad generates a musical sound with priority. Accordingly, a musical sound having the same tone being generated in the digital connection-type pad and the analog connection-type pad can be inhibited.

Referring back to FIG. 4(*a*), the description of the assignment port area 24*a*3 will be continued. When a virtual input port is assigned to a connected digital connection-type pad, the sound source device 11 stores individual information of the digital connection-type pad in the ID area 24*a*2 in association with a predetermined index number of the index area 24*a*1 and stores assignment port identification information identifying an assigned virtual input port in the assignment port area 24*a*3.

More specifically, in a case in which there are index numbers for which the assignment port identification information has not been registered, a smallest index number among the unregistered index numbers is identified. Then, for the identified index number, individual information of the digital connection-type pad and assignment port identification information identifying an assigned virtual input port are stored. In this way, assignment port identification information for a maximum of 14 digital connection-type pads can be stored in the digital pad assignment table 24*a*. In addition, practically, 14 digital connection-type pads are not connected for a short period. Accordingly, assignment port identification information for a digital connection-type pad being immediately overwritten by assignment port identification information for another digital connection-type pad can be inhibited. Accordingly, the assignment port identification information can be maintained for a long period.

In addition, in a manufacturing stage, "null" information is written in the ID area 24*a*2 in association with all the index numbers. In addition, information representing "−1" is written in the assignment port area 24*a*3 in association with all the index numbers. Accordingly, the sound source device 11 can determine an index number for which "null" information is stored in the ID area 24*a*2, and information representing "−1" is stored in the assignment port area 24*a*3 to be an index number for which information of assignment of a virtual input port has not been registered.

On the other hand, in a case in which there is no index number for which the assignment port identification information has not been registered, a smallest index number among index numbers for which assignment port identification information of digital connection-type pads that are not connected at that time point is identified. Then, for the identified index number, individual information of the digital connection-type pad and assignment port identification information identifying an assigned virtual input port are stored. In this way, even when assignment port identification information for 14 digital connection-type pads is stored in the digital pad assignment table 24*a*, assignment port identification information for a digital connection-type pad that is connected at the time point is maintained. In addition, the number of digital connection-type pads that can be connected to the sound source device 11 is a maximum of three as described above, and accordingly, necessarily, there is an index number for which assignment port identification information of a digital connection-type pad that is not connected at the time point is stored.

Here, since the digital pad assignment table 24*a* is a table stored in the flash memory 24, the digital pad assignment table 24*a* continues to be maintained in the digital pad assignment table 24*a* also for a period in which the power of the sound source device 11 is off. Accordingly, in a case in which a virtual input port is assigned temporarily to one digital connection-type pad connected to the sound source device 11, as long as the assignment port identification information continues to be maintained in the digital pad assignment table 24*a* without the assignment port identification information being overwritten, when the power of the sound source device 11 is on, the same virtual input port can be assigned to the one digital connection-type pad on the basis of the assignment port identification information stored in the digital pad assignment table 24*a*.

In addition, even when the one digital connection-type pad is detached from the sound source device 11 once, in a case in which the one digital connection-type pad is connected to the sound source device 11 again, the assignment port identification information for the one digital connection-type pad is maintained in the digital pad assignment table 24*a*, and accordingly, the same virtual input port can be assigned on the basis of the assignment port identification information.

In this way, a digital-type pad to which a virtual input port was assigned by being connected to the sound source device 11 in the past can be caused to generate a musical sound with the same tone as that at the time of being connected to the sound source device 11 in the past as the assignment port identification information thereof continues to be maintained in the digital pad assignment table 24*a*. Accordingly, the digital connection-type pad can be used without causing a user to have a feeling of strangeness.

The connection flag area 24*a*4 is an area used for storing a connection flag. The connection flag is a flag that represents whether a digital connection-type pad of which information is stored in association with the index number of the index area 24*a*1 is connected to the sound source device 11. In a case in which the value of the connection flag is "1", it represents that a digital connection-type pad stored with an index number associated with the connection flag is connected to the sound source device 11. In addition, in a case in which the value of the connection flag is "0", it represents that a digital connection-type pad stored with an index number associated with the connection flag is not connected to the sound source device 11.

In a case in which the power of the sound source device 11 is on, "0" is written in the connection flag area 24*a*4 for connection flags associated with all the index numbers temporarily. Thereafter, when connection of a digital connection-type pad is detected, a connection flag of a connection flag area 24*a*4 associated with an index number for which information of the digital connection-type pad is stored is set to "1". When it is detected that a digital connection-type pad that has been connected is not connected, the connection flag of a connection flag area 24*a*4 associated with an index number for which information of the digital connection-type pad is stored is cleared to "0".

By checking connection flags stored in this connection flag area 24*a*4, the sound source device 11 can determine an index number in which information relating to a digital connection-type pad not connected at that time point is stored.

The parameter area 24*a*5 is an area that stores parameters relating to an operation of a digital connection-type pad stored in association with an index number of the index area 24*a*1. In a manufacturing stage, "null" information is written in the parameter area 24*a*5 in association with all the index numbers.

In a case in which a digital connection-type pad is connected, when information relating to the digital connection-type pad is not stored in the digital pad assignment table 24*a*, the sound source device 11 acquires parameter initial values 52*b* stored in the digital connection-type pad. Then, assignment port identification information of the digital connection-type pad is stored in association with a predetermined index number, and the acquired parameter initial values 52*b* are stored in association with the same index number.

In the sound source device 11, parameters relating to an operation of the digital connection-type pad stored in the digital pad assignment table 24*a* are displayed on the LCD 25, and values of the parameters can be changed by a user operating the operator 26. When the values of the parameters are changed by the user, the sound source device 11 overwrites the parameters before change stored in the parameter area 24*a*5 of the digital pad assignment table 24*a* with the parameters after change for storage. In addition, the sound source device 11 transmits the parameters after change to the digital connection-type pad of which the parameters have been changed. In this way, a user can change the parameters relating to an operation of the digital connection-type pad through the sound source device 11 and can operate the digital connection-type pad on the basis of the changed parameters.

Here, as described above, the digital pad assignment table 24*a* continues to be maintained also for a period in which the power of the sound source device 11 is off. In this way, when parameters relating to an operation of a digital connection-type pad connected to the sound source device 11 are stored in the digital pad assignment table 24*a*, the parameters continue to be maintained also for a period in which the power of the sound source device 11 is off unless the parameters are overwritten with parameters of another digital connection-type pad. Even in a case in which the parameters are changed by a user, the parameters after change continue to be maintained in the digital pad assignment table 24*a*.

Thus, in a case in which connection of a digital connection-type pad is detected, the sound source device 11 checks whether or not information of the digital connection-type pad is stored in the digital pad assignment table 24*a*. Then, in a case in which the information is stored, parameters of the digital connection-type pad stored in the parameter area 24*a*5 of the digital pad assignment table 24*a* are transmitted to the digital connection-type pad. In this way, the sound source device 11 can operate a connected digital connection-type pad with the parameters set for the digital connection-type pad in the past reflected. Accordingly, a user resetting the parameters of the digital connection-type pad again can be inhibited, and accordingly, a burden on the user can be relieved.

Meanwhile, the digital pad assignment table 24*a* may be regarded as storing information (assigned port identification information, parameters, and the like) relating to a pad in association with individual information (ID) of the pad for each digital connection-type pad that has been connected temporarily to the sound source device 11. The digital pad assignment table 24*a* is stored in the flash memory 24 and thus continues to be maintained also for a period in which the power of the sound source device 11 is off. Accordingly, in a case in which a digital connection-type pad that has been connected to the sound source device 11 temporarily is connected to the sound source device 11 again, even when the power is off for a period in which the pad is detached, as long as the information relating to the pad continues to be stored in the digital pad assignment table 24*a*, the digital connection-type pad can be operated on the basis of the information.

In addition, the information relating to a digital connection-type pad stored in the digital pad assignment table 24*a* is not limited to the assigned port identification information and the parameters and may be arbitrary as long as the information is information relating to an operation of the pad. For example, information used for identifying a tone (in this embodiment, a tone assigned to an assigned virtual input port) output by the pad may be stored in the digital pad assignment table 24*a* in association with the individual information of the pad.

Next, details of the port-tone correspondence table 24*b* will be described with reference to FIG. 4(*b*). FIG. 4(*b*) is a schematic diagram schematically illustrating one example of details of the port-tone correspondence table 24*b*. This port-tone correspondence table 24*b* is a table that is used for assigning tones to 14 physical input ports 28*a* to 28*m* and 14 virtual input ports.

The port-tone correspondence table 24*b* is composed of a port area 24*b*1 and a tone area 24*b*2. The port area 24*b*1 is an area that defines types of ports (port types) of the physical input ports 28*a* to 28*m* and the virtual input ports, and the types are classified into 14 types including KICK, SNARE, TOM1, TOM2, TOM3, TOM4, HI-HAT, CRASH1, CRASH2, RIDE, AUX1, AUX2, AUX3, and AUX4.

14 kinds of port types defined in this port area 24*b*1 are commonly used by the physical input ports 28*a* to 28*m* and the virtual input ports. For example, "KICK" of the port area 24*b*1 is commonly used by the physical KICK input port 28*a* and a virtual KICK that is a virtual input port. "SNARE" of the port area 24*b*1 is commonly used by the physical SNARE input port 28*b* and a virtual SNARE that is a virtual input port. In other words, the same sound source is assigned to a physical input port and a virtual input port of which port types are the same.

In addition, port types defined in this port area 24*b*1 are written in a manufacturing stage of the sound source device 11 and thereafter continue to be maintained without being rewritten.

The tone area **24*b*2 is an area that, in association with each port type defined in the port area 24*b*1, defines a tone assigned to a port type. The sound source device 11 is configured to assign one tone in sound source data of tones of a plurality of kinds stored in the sound source circuit 29 for each port type. In the tone area 24*b*2, information representing the assigned tone is stored in association with a port type defined in the port area 24*b*1**.

In the tone area **24*b*2 of this port-tone correspondence table 24*b*, in a manufacturing stage of the sound source device 11, information representing a predetermined tone respectively are stored in association with each port type defined in the port area 24*b*1. In addition, in the sound source device 11, a tone assigned to each port type is configured to be able to be changed by a user. By operating the operator 26 while viewing a screen displayed on the LCD 25, a user can set one tone assigned to each port type in sound source data of tones of a plurality of kinds stored in the sound source circuit 29. When one tone is assigned to one port type by a user, information of a tone of the tone area 24*b*2** corresponding to one port type is rewritten with information representing one tone assigned by the user.

When playing information is acquired from each pad connected to the sound source device 11, the sound source device 11 generates a musical sound on the basis of the playing information. At this time, the sound source device 11 identifies a tone assigned to a port type of a physical input port or a virtual input port to which the pad is connected from the port-tone correspondence table **24*b*** and generates a musical sound signal corresponding to the tone.

For example, in the example illustrated in FIG. 4(*b*), in a case in which a musical sound is generated on the basis of playing information from a pad that is virtually connected to the virtual SNARE, the sound source device 11 identifies a tone "AAAAS" associated with the port type "SNARE" from the port-tone correspondence table **24*b* and generates a musical sound signal having the tone "AAAAS". In addition, in a case in which a musical sound is generated on the basis of playing information from a pad connected to a physical AUX4 input port 28*m*, the sound source device 11** generates a musical sound signal having a tone "YYY" that is associated with the port type "AUX4".

As described above, this port-tone correspondence table **24*b* is stored in the flash memory 24** and continues to be maintained also for a period in which the power is off. Accordingly, in a case in which a tone assigned to one port type is changed by a user, even when the power is off and is turned on again thereafter, the pad connected to the port type can generate a sound with the tone changed by the user.

Thereafter, details of the analog pad parameter table **24*c* will be described with reference to FIG. 4**(*c*). FIG. 4(*c*) is a schematic diagram schematically illustrating one example of details of the analog pad parameter table **24*c*. The analog pad parameter table 24*c* is a table that is used for storing parameters relating to an operation of an analog connection-type pad connected to a physical input port 28**.

This analog pad parameter table **24*c* is composed of a port area 24*c*1, a model number area 24*c*2, a parameter area 24*c*3, and a mute flag area 24*c*4. In the port area 24*c*1, port types of physical input ports 28 to which analog connection-type pads may be connected are defined similarly to the port area 24*b*1 of the port-tone correspondence table 24*b* illustrated in FIG. 4**(*b*). The port types defined in this port area **24*c*1 are written in a manufacturing stage of the sound source device 11** and thereafter, continue to be maintained without being rewritten.

The model number area **24*c*2 is an area that stores a model number of an analog connection-type pad input to be connected to an input port of the port type by a user is stored in association with each port type defined in the port area 24*c*1. The parameter area 24*c*3 is an area that stores parameters relating to an operation of an analog connection-type pad having a model number connected to the input port 28 of a port type in association with each port type defined in the port area 24*c*1. In a manufacturing stage of the sound source device 11, in the analog pad parameter table 24*c*, for each port type defined in the port area 24*c*1, a model number of a pad having a high possibility of being connected to the input port 28 of the port type is written in the model number area 24*c*2 as an initial value, and initial values of the parameters relating to an operation of a pad having the model number are written in the parameter area 24*c*3**.

In a case in which a user connects an analog connection-type pad having a model number different from the model numbers defined in the model number area **24*c*2 to the input port 28 of a certain port type, parameters relating to an operation of the connected analog connection-type pad are set by operating the operator 26. More specifically, a user selects a port type of the input port 28 of which setting of parameters needs to be changed and then inputs a model number of a connected pad to the sound source device 11. Accordingly, the sound source device 11 reads initial values of parameters relating to an operation of the pad, which are stored in advance for the pad having the model number, from the parameter initial value table 22*a* for an analog pad. Then, the sound source device 11 stores the read initial values of the parameters relating to the operation of the pad in the parameter area 24*c*3 in association with the port type of the input port 28** selected by the user.

In addition, the sound source device 11 may be configured such that parameters relating to an operation of a connected pad can be manually set by a user for the port type of the input port 28 selected by the user.

The parameters stored in the parameter area **24*c*3 are configured to be able to be changed by a user. In other words, a user operates the operator 26 while viewing the screen displayed on the LCD 25, thereby changing parameters relating to an operation of a connected pad for the port type of the input port 28 that has been selected. The parameters after change are stored in the parameter area 24*c*3 by overwriting the parameters before change associated with the port type of the input port 28** of which the parameters have been changed with the parameters after change.

The mute flag area **24*c*4 is an area that stores a mute flag in association with each port type defined in the port area 24*c*1. The mute flag is a flag representing that generation of a musical sound based on the analog connection-type pad connected to the input port 28 of a corresponding port type is in the state of being mute. As described above, in a case in which a digital connection-type pad is in the state of virtually being connected to a virtual input port, the sound source device 11 causes the generation of a musical sound based on an analog connection-type pad connected to a physical input port corresponding to the virtual input port to be mute. In a case in which the value of the mute flag is "1", it represents that an analog connection-type pad connected to the input port 28 of a port type associated with the mute flag is in the state of being mute. In addition, in a case in which the value of the mute flag is "0", it represents that an analog connection-type pad connected to the input port 28** of a port type associated with the mute flag is in the state of being non-mute.

In a case in which the power of the sound source device 11 becomes on, "0" is written in the mute flag area 24*c*4 in association with all the port types once. Thereafter, when connection of a digital connection-type pad is detected, and a virtual input port is assigned to the digital connection-type pad, "1" is stored in the mute flag area 24*c*4 in association with the same port type as the port type of the assigned virtual input port. Accordingly, generation of a musical sound becomes mute for an analog connection-type pad connected to a physical input port 28 of the same port type as that of the virtual input port to which the digital connection-type pad is virtually connected.

On the other hand, when it is detected that the digital connection-type pad that has been connected to the sound source device 11 becomes non-connected, the sound source device 11 stores "0" in the mute flag area 24*c*4 in association with the same port type as that of a virtual input port assigned to the digital connection-type pad that becomes non-connected. Accordingly, the mute state is released for the analog connection-type pad connected to the physical input port 28 of the same port type as that of the virtual input port to which the digital connection-type pad that becomes non-connected is virtually connected.

The sound source device 11 determines whether or not a mute state is set for an analog connection-type pad connected to the physical input port 28 by referring to the mute flag stored in the mute flag area 24*c*4. Then, in a case in which the analog connection-type pad is set to a mute state, playing information from the analog connection-type pad is ignored, and a musical sound signal is not generated.

On the other hand, in a case in which the analog connection-type pad is in a non-mute state, the sound source device 11 reads parameters (parameters associated with each port type of an input port to which the analog connection-type pad is connected in the analog pad parameter table 24*c*) relating to an operation of the analog connection-type pad from the parameter area 24*c*3. The sound source device 11 determines a generation timing of a musical sound, an intensity (velocity) of the sound generation, and the like while analyzing the playing information (vibration level) acquired from the analog connection-type pad in accordance with the parameters. Then, the sound source device 11 generates a musical sound signal with a tone of the input port 28, to which the analog connection-type pad is connected, which is assigned using the port-tone correspondence table 24*b*.

Referring back to FIG. 3, the description will be continued. The LCD 25 is a liquid crystal display device that displays a screen representing the state of the sound source device 11 and a screen for settings of the sound source device 11. The operator 26 is a switch group that is used by a user for operating the sound source device 11.

The sound source circuit 29 is a circuit, in which various kinds of sound source data are stored, generating a digital signal having a tone and a volume instructed to be generated for the sound source circuit 29 from the CPU 21 using the sound source data. The DAC 30 is a conversion device that converts a digital signal output from the sound source circuit 29 into an analog sound signal. The built-in amplifier speaker 15 is a device that generates a sound by amplifying a sound signal transmitted from the DAC 30 and converting the sound signal into a physical vibration. In other words, on the basis of a sound generation instruction from the CPU 21, a sound having a tone and a volume represented in the sound generation instruction is generated from the built-in amplifier speaker 15.

Figure 6:
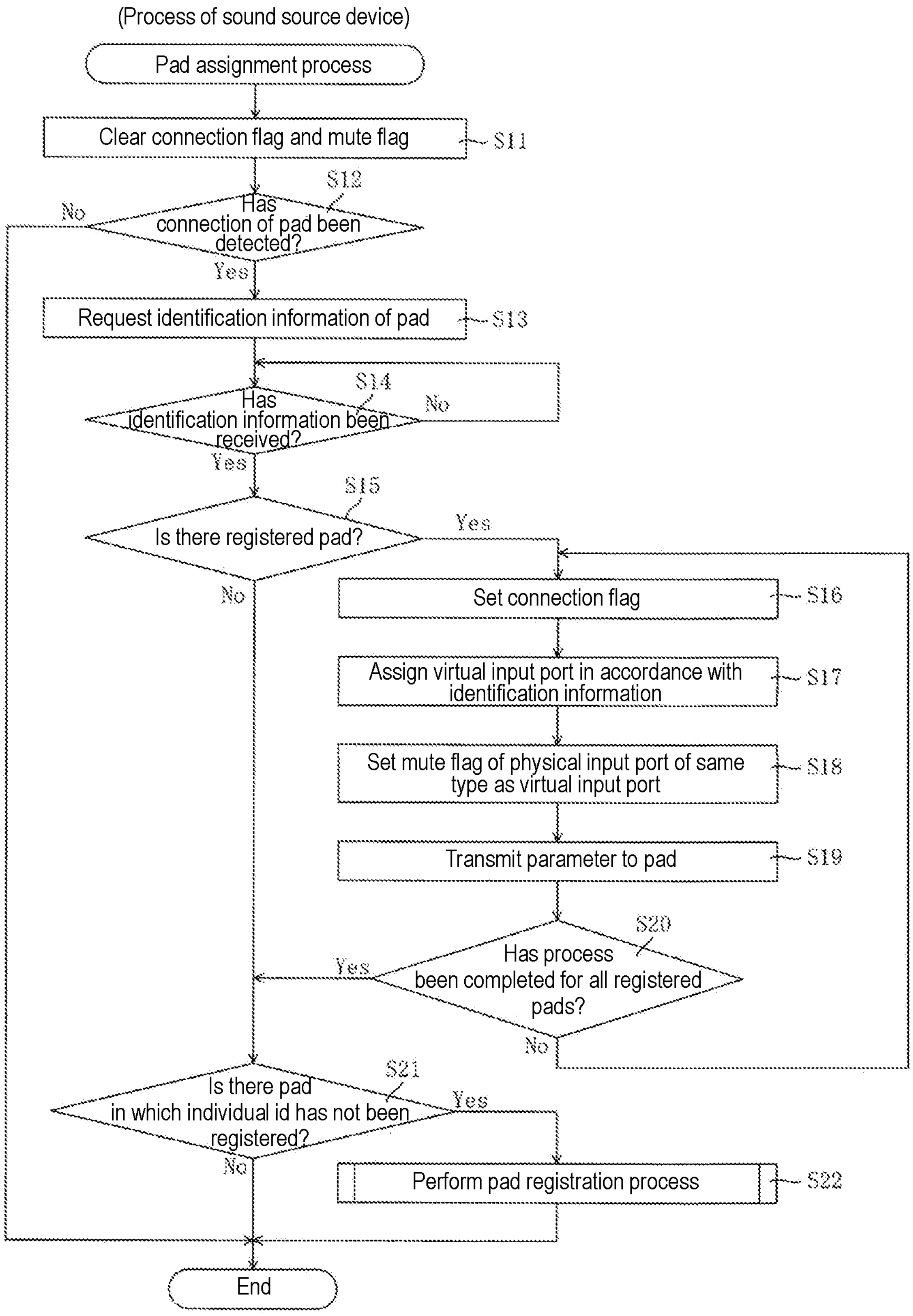
FIG. 6 is a flowchart illustrating a pad assignment process executed by a CPU disposed inside a sound source device.

Thereafter, a pad assignment process executed by the CPU 21 of the sound source device 11 will be described with reference to FIG. 6. FIG. 6 is a flowchart illustrating the pad assignment process. This pad assignment process is a process for assigning a virtual input port to a digital connection-type pad connected to the sound source device 11. This pad assignment process is necessarily executed after the power of the sound source device 11 is on. In addition, this pad assignment process is executed also in a case in which connection of the digital connection-type pad is detected during the operation of the sound source device 11.

In the pad assignment process, first, all connection flags stored in the connection flag area 24*a*4 of the digital pad assignment table 24*a* and all the mute flags stored in the mute flag area 24*c*4 of the analog pad parameter table 24*c* are cleared to "0" (S11). Thereafter, it is determined whether or not connection of a digital connection-type pad has been detected in the USB connector of the USB I/F 27 (S12). Then, in a case in which connection of a pad is not detected (S12: No), this process ends. On the other hand, in a case in which connection of a pad is detected in the process of S12 (S12: Yes), the process proceeds to the process of S13. All the pads that are detected in the process of S12 are pads that are targets for assignment of virtual input ports (hereinafter, referred to as "assignment target pads") in this process.

In addition, the processes of S11 and S12 are processes performed only in a case in which a pad assignment process is executed first after the power of the sound source device 11 becomes on. In a case in which a pad assignment process is executed on the basis of detection of connection of a digital connection-type pad during the operation of the sound source device 11, the processes of S11 and S12 are skipped, and the process starts from S13. In this case, a pad of which connection has been detected is an assignment target pad in this process.

In the process of S13, all the assignment target pads are requested to transmit identification information 52*a* (S13). Then, it is determined whether or not the identification information 52*a* has been received from all the assignment target pads for the request (S14). In a case in which the identification information 52*a* has not been received (S14: No), the process of S14 is repeatedly executed, and the process waits until the identification information 52*a* is received from all the assignment target pads.

In a case in which it is determined that identification information 52*a* has been received from all the assignment target pads in the process of S14 (S14: Yes), thereafter, it is determined whether or not there is an assignment target pad registered in the digital pad assignment table 24*a* (S15). More specifically, it is determined whether or not individual information included in the received identification information 52*a* is stored in the ID area 24*a*2 of the digital pad assignment table 24*a* for each assignment target pad.

As a result, in a case in which there is no assignment target pad registered in the digital pad assignment table 24*a* in advance (S15: No), the process proceeds to the process of S21. On the other hand, in a case in which there are assignment target pads registered in the digital pad assignment table 24*a* in advance (S15: Yes), processes of S16 to S19 are executed for all the registered assignment target pads.

More specifically, first, in the digital pad assignment table 24*a*, an index number of the index area 24*a*1 (hereinafter, referred to as a "assignment target pad index number") for which individual information of the assignment target pad is associated with the ID area 24*a*2 is identified, and the connection flag of the connection flag area 24*a*4 associated with the assignment target pad index number is set to "1" (S16). In this way, connection of the assignment target pad to the sound source device 11 can be indicated.

Next, assignment port identification information of the assignment port area 24$a$3 associated with the assignment target pad index number is acquired from the digital pad assignment table 24$a$, and a virtual input port identified using the assignment port identification information is assigned to the assignment target pad (S17).

Accordingly, in a case in which a virtual input port is assigned to a certain digital connection-type pad in accordance with connection to the sound source device 11 in the past, as long as the assignment port identification information continues to be maintained in the digital pad assignment table 24$a$, when the power of the sound source device 11 is on or the digital connection-type pad is connected during the operation of the sound source device 11, the same virtual input port as that assigned in the past can be assigned to the digital connection-type pad. Accordingly, such a digital connection-type pad can be caused to generate a musical sound with the same tone as that at the time of being connected to the sound source device 11 in the past, and accordingly, the digital connection-type pad can be used without causing the user to have a feeling of strangeness.

Next, a process of setting a physical input port 28 of which the port type is the same as that of the virtual input port assigned to the assignment target pad in the process of S17 to be mute is performed (S18). More specifically, in the analog pad parameter table 24$c$, the mute flag of the mute flag area 24$c$4 is set to "1" in association with a port type of the physical input port 28 to be set to be mute among port types defined in the port area 24$c$1. Accordingly, generation of a musical sound becomes mute for an analog connection-type pad connected to a physical input port 28 of the same port type as that of a virtual input port to which a digital connection-type pad is virtually connected.

Next, in the digital pad assignment table 24$a$, parameters of the parameter area 24$a$5 associated with the assignment target pad index number (parameters relating to an operation of the assignment target pad) are acquired and are transmitted to the assignment target pad (S19). Accordingly, the assignment target pad operates in accordance with the parameters transmitted in the process of S19.

As described above, when a certain digital connection-type pad is connected to the sound source device 11, parameters relating to an operation of the digital connection-type pad are maintained in the parameter area 24$a$5 of the digital pad assignment table 24$a$. When values of the parameters are changed by a user, the parameters after change are maintained in the parameter area 24$a$5. Accordingly, as long as the parameters of the digital connection-type pad continue to be maintained in the digital pad assignment table 24$a$, when the power of the sound source device 11 is turned on or when the digital connection-type pad is connected during an operation of the sound source device 11, the digital connection-type pad can be operated with parameters set to the digital connection-type pad in the past reflected. Accordingly, the user resetting the parameters of the digital connection-type pad again can be inhibited, therefore, the burden on the user can be alleviated.

After the process of S19, it is determined whether or not the processes of S16 to S19 have been executed for all the assignment target pads registered in the digital pad assignment table 24$a$ (S20). As a result, in a case in which there is an assignment target pad for which the processes of S16 to S19 have not been executed (S20: No), the process is returned to the process of S16, and the processes of S16 to S19 are executed for the unexecuted assignment target pad. On the other hand, in a case in which it is determined that the processes of S16 to S19 have been executed for all the assignment target pads registered in the digital pad assignment table 24$a$ (S20: Yes), the process proceeds to the process of S21.

In the process of S21, it is determined whether or not there is an assignment target pad that is not registered in the digital pad assignment table 24$a$ (S21). In a case in which there is no unregistered assignment target pad (S21: No), the pad assignment process ends. On the other hand, in a case in which there is an unregistered assignment target pad (S21: Yes), a pad registration process is executed (S22). After execution of the pad registration process (S22), the pad assignment process ends.

The pad registration process of S22 is a process of assigning a virtual input port to an assignment target pad that is not registered in the digital pad assignment table 24$a$ (hereinafter, referred to as a "unregistered assignment target pad") and storing the assignment port identification information thereof in the digital pad assignment table 24$a$. In addition, in a case in which there are a plurality of unregistered assignment target pads, assignment of virtual input ports is performed for all the unregistered assignment target pads.

Figure 7:
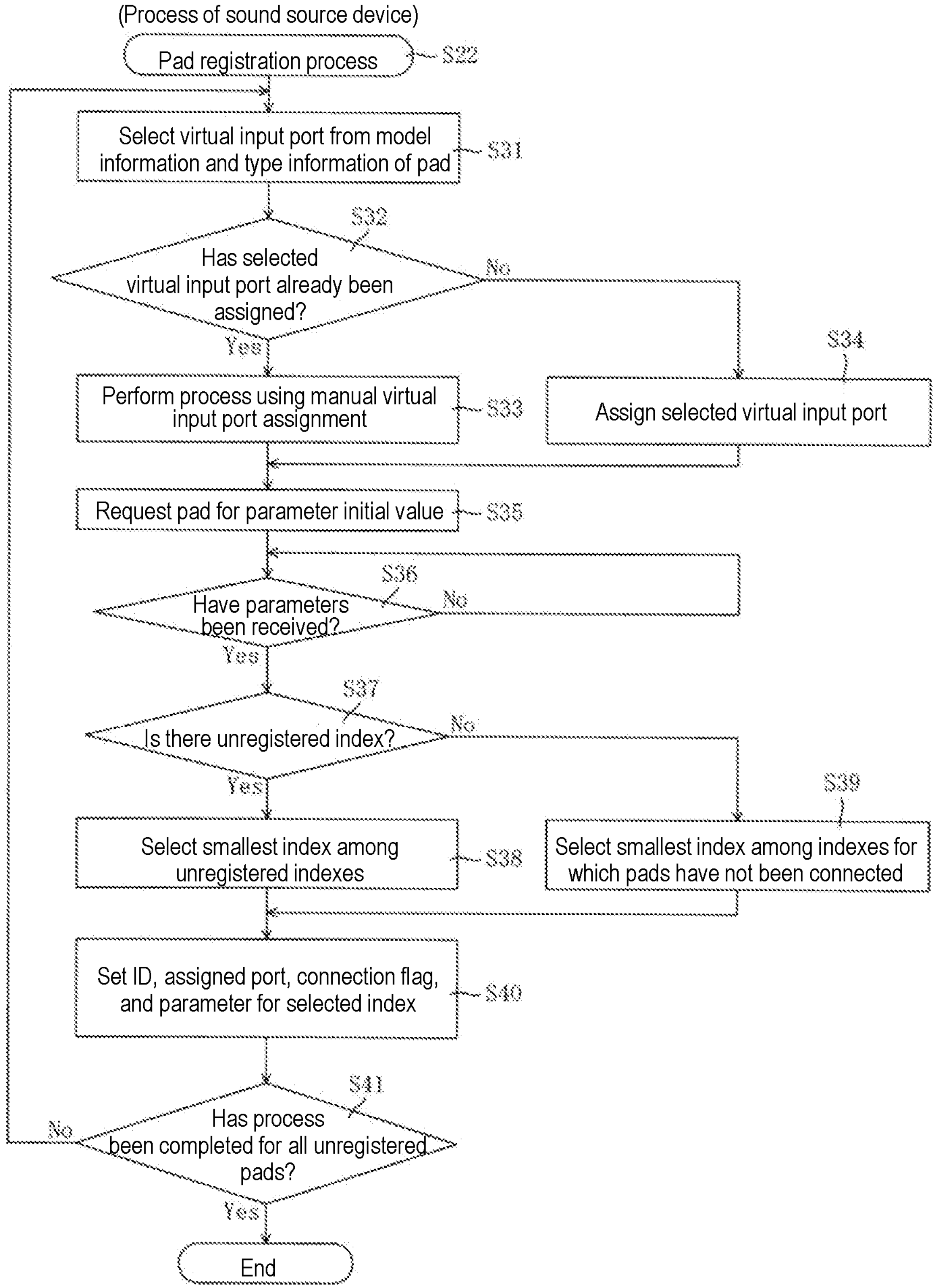
FIG. 7 is a flowchart illustrating a pad registration process executed by a CPU disposed inside a sound source device.

Here, details of the pad registration process (S22) will be described with reference to FIG. 7. FIG. 7 is a flowchart illustrating the pad registration process (S22).

In the pad registration process (S22), first, in the process of S14 of the pad assignment process (FIG. 6), a model number and a pad type (a base drum, a snare drum, or the like) of the unregistered assignment target pad are determined on the basis of model information and type information included in the identification information 52$a$ received from the unregistered assignment target pad, and a virtual input port that is appropriate for the unregistered assignment target pad is selected in accordance with the determination (S31). Here, in a case in which there are a plurality of unregistered assignment target pads, the process of S31 is performed for one unregistered assignment target pad among unregistered assignment target pads for which assignment of a virtual input port has not been executed.

Next, it is determined whether or not the virtual input port that has been selected in the process of S31 has already been assigned to another digital connection-type pad (S32). More specifically, the assignment port identification information stored in the assignment port area 24$a$3 of the digital pad assignment table 24$a$ and the connection flag stored in the connection flag area 24$a$4 are referred to. Then, it is determined whether or not there is a pad to which the virtual input port selected in the process of S31 has been assigned among pads of which connection flags are set to "1" (pads which are connected to the sound source device 11 and to which virtual input ports have been assigned), whereby the determination of S32 is performed.

In a case in which it is determined that the virtual input port selected in the process of S31 has not been assigned to another digital connection-type pad in the process of S32 (S32: No), the selected virtual input port is assigned to an unregistered assignment target pad (S34), and the process proceeds to the process of S35.

On the other hand, in a case in which it is determined that the virtual input port selected in the process of S31 has already been assigned to another digital connection-type pad in the process of S32 (S32: No), a process in which a virtual input port that is manually selected by a user is assigned to the unregistered assignment target pad is executed (S33), and the process proceeds to the process of S35.

More specifically, first, the assignment port identification information stored in the assignment port area 24*a*3 of the digital pad assignment table 24*a* and the connection flag stored in the connection flag area 24*a*4 are referred to. Next, a digital connection-type pad which is connected to the sound source device 11 at that time point and to which a virtual input port has been assigned is identified, and a port type of the input port that has been assigned is determined. Next, the port types of the virtual input ports to which a digital connection-type pad has not been assigned is presented to the user by displaying the port types on the LCD 25, and the user is prompted to select a port type to be assigned to the unregistered assignment target pad among the presented port types. Then, a virtual input port of the port type selected by the user by operating the operator 26 is assigned to the unregistered assignment target pad.

Accordingly, in a case in which another digital connection-type pad of the same type as one digital connection-type pad is connected to the sound source device 11, a virtual input port selected by the user can be assigned to the another digital connection-type pad. At this time, the sound source device 11 causes the user to select the virtual input port assigned to the another digital connection-type pad among virtual input ports that have not been assigned. Accordingly, the same tone as a tone generated by one digital connection-type pad being generated by another digital connection-type pad can be inhibited. In addition, a musical sound of a tone desired by the user can be generated from the another digital connection-type pad.

In the process of S35, an unregistered assignment target pad is requested to transmit parameter initial values 52*b* relating to an operation of the unregistered assignment target pad (S35). Then, it is determined whether the parameter initial values 52*b* have been received from the unregistered assignment target pad in response to the request (S36), and the process of S36 is repeatedly executed while the parameter initial values 52*b* are not received (S36: No). Accordingly, the process stands by until the parameter initial values 52*b* are received from the unregistered assignment target pad.

On the other hand, in a case in which it is determined that the parameter initial values 52*b* have been received from the unregistered assignment target pad (S36: Yes) in the process of S36 (S36: Yes), next, it is determined whether or not there is an index number for which the assignment port identification information is not registered in the digital pad assignment table 24*a* (S37). As a result, in a case in which it is determined that that there are index numbers for which assignment port identification information has not been registered (S37: Yes), a smallest index number is selected among index numbers for which assignment port identification information has not been registered in the digital pad assignment table 24*a* (S38), and the process proceeds to the process of S40.

On the other hand, in a case in which it is determined that there is no index number for which assignment port identification information has not been registered in the digital pad assignment table 24*a* in the process of S37 (S37: No), a smallest index number is selected among index numbers for which assignment port identification information of digital connection-type pads that are not connected at that time point is stored by referring to the connection flag area 24*a*4 of the digital pad assignment table 24*a* (S39), and the process proceeds to the process of S40.

Then, for the digital pad assignment table 24*a*, individual information of an unregistered assignment target pad (individual information included in the identification information 52*a* received from an unregistered assignment target pad in the process of S14 of the pad assignment process (FIG. 6)) is stored in the ID area 24*a*2 in association with an index number selected in the process of S38 or S39, assignment port identification information identifying a virtual input port assigned in the process of S33 or S34 is stored in the assignment port area 24*a*3, the connection flag of the connection flag area 24*a*4 is set to "1", and the parameter initial values 52*b* of which reception has been checked in the process of S36 is stored in the parameter area 24*a*5 (S40). Then, the process proceeds to the process of S41.

In a case in which there are index numbers for which the assignment port identification information has not been registered, assignment port identification information and the like of an unregistered assignment target pad are stored for a smallest index number among unregistered index numbers. Accordingly, until assignment port identification information is stored for a maximum of 14 digital connection-type pads, the assignment port identification information can be maintained in the digital pad assignment table 24*a*. In addition, practically, there is no case in which 14 digital connection-type pads are connected in a short period, and accordingly, assignment port identification information for digital connection-type pads can be maintained for a long period.

In addition, in a case in which there is no index number for which assignment port identification information has not been registered, for a smallest index number among index numbers for which assignment port identification information of digital connection-type pads that are not connected at that time point is stored, assignment port identification information and the like of unregistered assignment target pads are stored. Accordingly, although assignment port identification information for 14 digital connection-type pads is stored in the digital pad assignment table 24*a*, assignment port identification information for digital connection-type pads that are connected at the time point can be maintained.

In the process of S41, it is determined whether or not the processes of S31 to S40 have been executed for all the unregistered assignment target pads (S41). As a result, in a case in which there is an unregistered assignment target pad for which the processes of S31 to S40 have not been executed (S41: No), the process is returned to the process of S31, and the processes of S31 to S40 are executed for the unregistered assignment target pad for which the processes have not been executed. On the other hand, in a case in which the processes of S31 to S40 have been executed for all the unregistered assignment target pads (S41: Yes), the pad registration process ends.

Figure 8A:
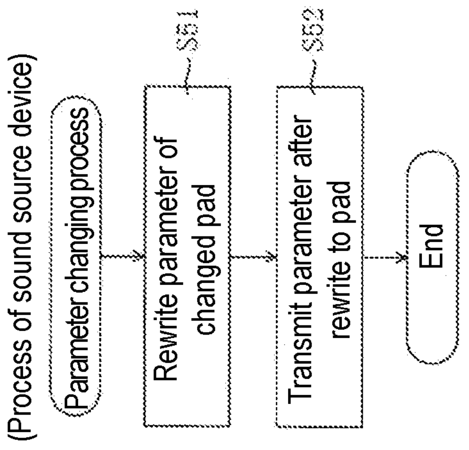
FIG. 8(*a*) is a flowchart illustrating a parameter changing process executed by a CPU disposed inside a sound source device, FIG. 8(*b*) is a flowchart illustrating an analog pad sound generation process executed by a CPU disposed inside a sound source device, and FIG. 8(*c*) is a flowchart illustrating a tone assignment process executed by a CPU disposed inside a sound source device.
Figure 8B:
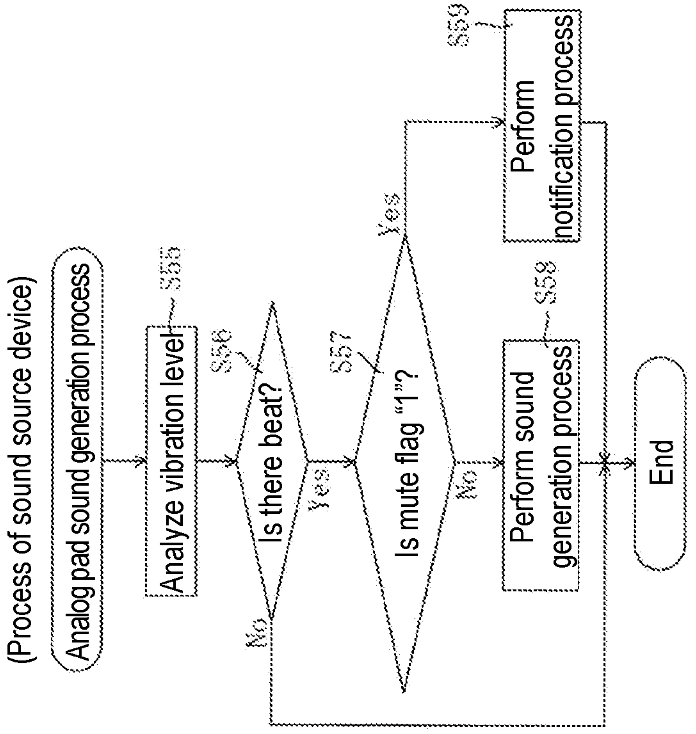
Figure 8C:
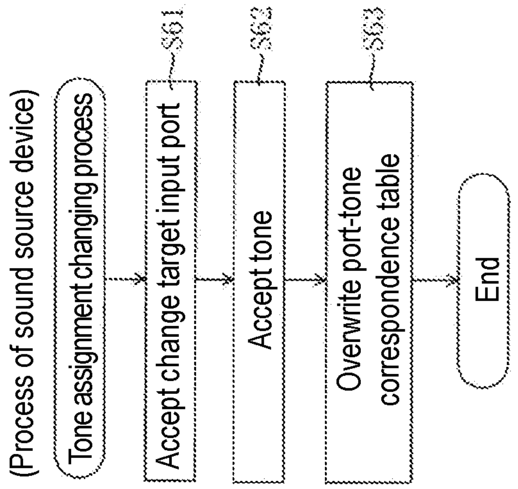

Next, details of the parameter changing process executed by the CPU 21 disposed inside the sound source device 11 will be described with reference to FIG. 8(*a*). FIG. 8(*a*) is a flowchart illustrating the parameter changing process. The parameter changing process is a process for executing a process relating to a change in a case in which parameters relating to an operation of a digital connection-type pad connected to the sound source device 11 are changed by a user. This process is executed in a case in which there is an input of change of the parameters from the user.

In the parameter changing process, first, for a digital connection-type pad of which parameters have been changed, the parameters are rewritten (S51). More specifically, in the digital pad assignment table 24*a*, parameters of the parameter area 24*a*5 corresponding to an index number in which individual information of a digital connection-type pad of which parameters have been changed is stored in the ID area 24*a*2 are overwritten with parameters after change. Accordingly, the parameters after change are maintained in the sound source device 11.

Next, the parameters after change are transmitted to the digital connection-type pad of which the parameters have been changed (S52), and the parameter changing process ends. In this way, a user can change parameters relating to an operation of a digital connection-type pad through the sound source device 11, and the digital connection-type pad can be operated on the basis of the changed parameters.

Next, details of the analog pad sound generation process executed by the CPU 21 disposed inside the sound source device 11 will be described with reference to FIG. 8(*b*). FIG. 8(*b*) is a flowchart illustrating the analog pad sound generation process. The analog pad power generation process is a process of controlling sound generation of an analog connection-type pad connected to the sound source device 11. The analog pad sound generation process is repeatedly executed for every predetermined time while the sound source device 11 is on.

In the analog pad sound generation process, first, while referring to parameters defined in each input port in the parameter area 24*c*3 of the analog pad parameter table 24*c*, a vibration level signal acquired as playing information from an analog connection-type pad for each input port is analyzed (S55). As a result of the analysis, it is determined whether or not there has been a beat for the pad (S56). As a result, in a case in which it is determined that there has been no beat (S56: No), the analog pad sound generation process ends.

On the other hand, in a case in which it is determined that there has been a beat for the pad (S56: Yes), next, it is determined whether or not a mute flag of a physical input port 28 to which the analog connection-type pad for which there has been the beat is connected is set to "1" among mute flags of physical input ports 28 defined in the mute flag area 24*c*4 by referring to the analog pad parameter table 24*c* (S57).

Then, when the mute flag is not set to "1" (S57: No), a sound generation process for the beat is executed (S58), and this process ends. On the other hand, when the mute flag is set to "1" (S57: Yes), the process of S59 is executed instead of the process of S58, and this process ends.

In the process of S59, a notification used for notifying a user that a physical input port to which the beaten analog connection-type pad is connected is set to a mute state is performed. As a notification method thereof, an arbitrary method such as displaying of a message informing an indication thereof on the LCD 25 of the sound source device 11, changing of a color of a backlight of the LCD 25 from a color of a normal time for a predetermined time, generating of a warning sound with a tone different from a tone assigned to each pad (for example, a beep sound), or the like may be used.

As described above, in this sound source device 11, in the case of a state in which a digital connection-type pad is virtually connected to a virtual input port, a physical input port corresponding to the virtual input port is set to a mute state (a mute flag is set to "1"). In this case, even when an analog connection-type pad is connected to the physical input port and the pad is beaten, the process of S58 is set to be non-executed, and accordingly, generation of a musical sound based on the pad can be caused to be mute. Accordingly, in a case in which a digital connection-type pad and an analog connection-type pad of the same type are connected to the sound source device 11, a musical sound is generated by the digital connection-type pad with priority, and musical sounds of the same tone being generated by the digital connection-type pad and the analog connection-type pad can be inhibited.

In addition, in this case, when the analog connection-type pad is beaten, a notification is performed by the process of S59. Accordingly, a user can perceive a state in which a digital connection-type pad and an analog connection-type pad of the same type are connected to the sound source device 11, and the digital connection-type pad generates a musical sound with priority. In addition, in this embodiment, although a notification is performed in a case in which a physical input port to which a beaten analog connection-type pad is connected is set to a mute state, the notification may be configured not to be performed.

Next, details of the tone assignment changing process executed by the CPU 21 disposed inside the sound source device 11 will be described with reference to FIG. 8(*c*). FIG. 8(*c*) is a flowchart illustrating the tone assignment changing process. The tone assignment changing process is a process for executing a process relating to a change in a case in which the change of a tone assigned to each input port in accordance with the port-tone correspondence table 24*b* is performed by a user. This process is executed in a case in which an input of change of the assignment of tones is performed by the user.

In the tone assignment changing process, first, a port type of an input port that is a change target, which has been input by a user, is accepted (S61). Next, a tone after change input by the user is accepted (S62). Then, information of the tone of the tone area 24*b*2 associated with each port type accepted in the process of S64 is overwritten with information representing tones accepted in S65 in the port-tone correspondence table 24*b* (S63), and the tone assignment changing process ends.

Accordingly, in a case in which a tone assigned to each input port is changed by a user, information of tones after change can be stored in the port-tone correspondence table 24*b*. The port-tone correspondence table 24*b* is stored in the flash memory 24. Accordingly, in a case in which a tone assigned to one port type is changed by a user, even when the power is off and then is turned on again thereafter, a pad connected to the port type can generate a sound with the tone changed by the user.

Figure 9A:
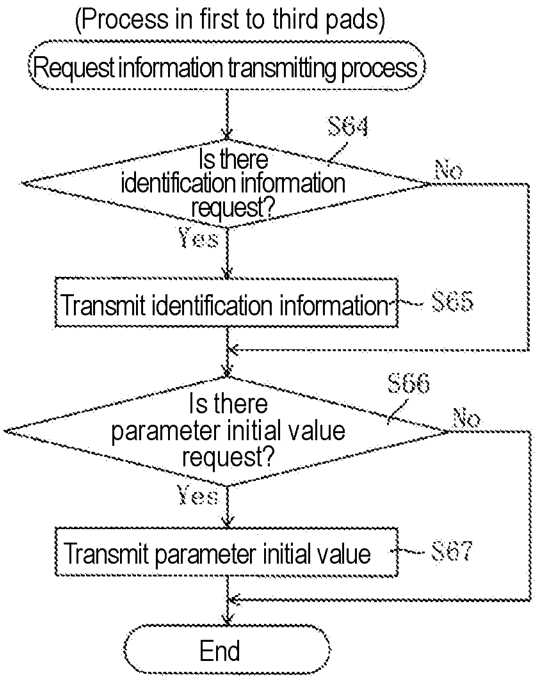
FIG. 9(*a*) is a flowchart illustrating a request information transmitting process executed by CPU disposed inside first to third pads, FIG. 9(*b*) is a flowchart illustrating a parameter receiving process executed by the CPU disposed inside the first to third pads, and FIG. 9(*c*) is a flowchart illustrating a parameter selecting process executed by the CPU disposed inside the first to third pads.
Figure 9B:
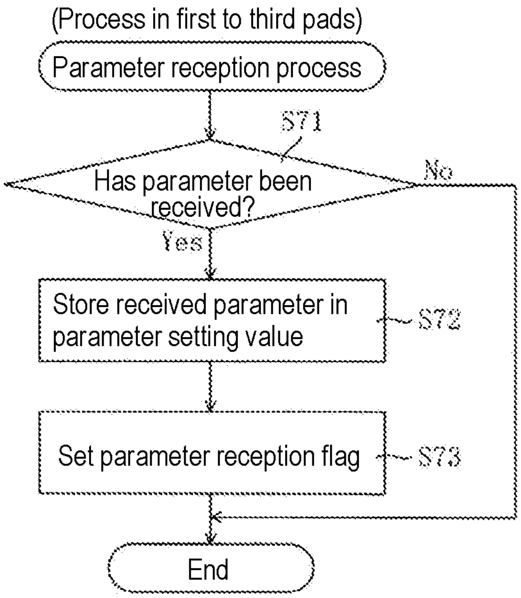
Figure 9C:
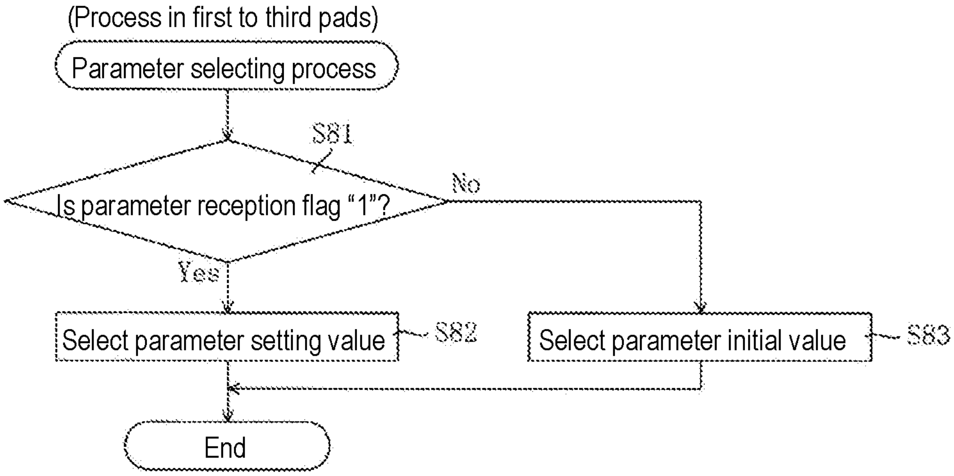

Next, a request information transmitting process executed by the CPU 51 inside digital connection-type pads (first to third pads 41 to 43) will be described with reference to FIG. 9(*a*). FIG. 9(*a*) is a flowchart illustrating the request information transmitting process. This request information transmitting process is a process for transmitting information requested from the sound source device 11 and is repeatedly executed for every predetermined time by the CPU 51.

In the request information transmitting process, first, it is determined whether there is a request for transmission of the identification information 52*a* from the sound source device 11 (S64). In a case in which there is a request for transmission of the identification information 52*a* (S64: Yes), the identification information 52*a* is read from the ROM 52 and is transmitted to the sound source device 11 (S65), and the process proceeds to the process of S66. The identification information 52*a* transmitted in the process of S65 is used by the sound source device 11 for performing assignment of a tone to this pad, management of the assigned tone, and the like.

As a result of the process of S64, in a case in which there is no request for transmission of the identification information 52*a* (S64: No), the process of S65 is skipped, and the process proceeds to the process of S66. In the process of S66, it is determined whether there is a request for transmission of the parameter initial values 52*b* from the sound source device 11 (S66). As a result thereof, when there is a request for transmission of the parameter initial values 52*b* (S66: Yes), the parameter initial values 52*b* are read from the ROM 52 and are transmitted to the sound source device 11 (S67), and this process ends. In the process of S67, the sound source device 11 can manage parameters relating to an operation of this pad, and the sound source device 11 may enable a user to change the parameters.

As a result of the process of S66, when there is no request for transmission of the parameter initial values 52*b* (S66: No), the process of S67 is skipped, and this process ends.

Next, a parameter receiving process executed by the CPU 51 disposed inside digital connection-type pads (first to third pads 41 to 43) will be described with reference to FIG. 9(*b*). FIG. 9(*b*) is a flowchart illustrating the parameter receiving process. This parameter receiving process is a process for receiving transmitted parameters after change in a case in which the parameters relating to an operation of this pad, which have been changed in the sound source device 11 by a user (see S51 illustrated in FIG. 8(*a*)), are transmitted from the sound source device 11 (see S52 illustrated in FIG. 8(*a*)). The parameter receiving process is repeatedly executed by the CPU 51 for every predetermined time.

In the parameter receiving process, first, it is determined whether or not parameters after change transmitted in the process of S52 illustrated in FIG. 8(*a*) from the sound source device 11 have been received (S71). As a result thereof, in a case in which the parameters after change have not been received (S71: No), the parameter receiving process ends.

On the other hand, as a result of the process of S71, in a case in which the parameters after change have been received (S71: Yes), first, the received parameters after change are stored in the RAM 53 as parameter setting values 53*b* (S72), the parameter reception flag 53*a* is set to "1" (S73), and the parameter receiving process ends.

Accordingly, the parameters changed by the user in the sound source device 11 can be reflected in the operation of this pad.

Next, a parameter selecting process executed by the CPU 51 disposed inside digital connection-type pads (first to third pads 41 to 43) will be described with reference to FIG. 9(*c*). FIG. 9(*c*) is a flowchart illustrating the parameter selecting process. The parameter selecting process is a process for selecting parameters used by this pad and is executed when the CPU 51 reads parameters required for an operation of this pad.

In the parameter selecting process, first, it is determined whether or not the parameter reception flag 53*a* is "1" (S81). As a result thereof, in a case in which the parameter reception flag 53*a* is "1" (S81: Yes), the parameter setting values 53*b* stored in the RAM 53 are selected (S82), and the parameter selecting process ends. Accordingly, this pad can be operated using the parameters changed by the user in the sound source device 11 which are received in the parameter receiving process (see FIG. 9(*b*)).

On the other hand, as a result of the process of S81, in a case in which the parameter reception flag 53*a* is not "1" (S81: No), the parameter initial values 52*b* stored in the ROM 52 are selected (S83), and the parameter selecting process ends.

Accordingly, in a case in which parameters are not changed by a user in the sound source device 11, and parameters are not received from the sound source device 11, this pad can be operated using the parameter initial values 52*b* stored in the ROM 52.

As described above, according to the sound source device 11 of this embodiment, in addition to a physical USB connector disposed in the USB I/F 27, a virtual input port is provided for each pad type of digital connection-type pad. A tone generated on the basis of playing information input to the virtual input port is assigned to the virtual input port using the port-tone correspondence table 24*b*. Then, when it is detected that a digital connection-type pad is connected to the USB connector of the sound source device 11, identification information 52*a* including individual information, model information, and type information is acquired by the sound source device 11 from the connected digital connection-type pad.

Then, a virtual input port that is appropriate for a digital connection-type pad is assigned to the digital connection-type pad of which connection with the USB connector of the sound source device 11 has been detected on the basis of the model information and the type information included in the acquired identification information 52*a*. When playing information is acquired from the digital connection-type pad connected to the USB connector, a musical sound signal of a tone assigned in the port-tone correspondence table 24*b* is generated for a virtual input port assigned to the digital connection-type pad on the basis of the playing information. In this way, the degree of freedom of setting of a tone to a digital connection-type pad connected to the sound source device 11 can be increased, and the assignment of a tone can be performed with the same sense as that of the case of an analog connection-type pad and can be performed such that is can be easily understood by the user.

On the other hand, in a case in which a virtual input port corresponding to model information and type information of the identification information 52*a* acquired from a digital connection-type pad is in a state of being assigned to another digital connection-type pad, the assignment of the virtual input port to the digital connection-type pad of which connection with the USB connector has been detected is configured not to be executed. Accordingly, generation of musical sounds using the same tone in a case in which a digital connection-type pad of the same type as that of a digital connection-type pad that has already been connected is connected can be inhibited.

In addition, in a case in which a virtual input port corresponding to each type of digital connection-type pad of which connection with one USB connector has been detected is determined to be in the state of being assigned to another digital connection-type pad, assignment of one virtual input port among virtual input ports not assigned to the connected digital connection-type pad can be accepted from a user. Then, the one virtual input port accepted from the user is assigned to the digital connection-type pad of which connection with one USB connector has been detected. Accordingly, in a case in which a digital connection-type pad of the same type as that of a digital connection-type pad that has already been connected is connected to the sound source device 11, a musical sound can be generated using a different tone set by the user.

In addition, in a case in which it is detected that a digital connection-type pad has been connected to the USB connector, parameters relating to an operation of the digital connection-type pad are acquired from the connected digital connection-type pad. The parameters are stored in the digital pad assignment table 24*a* in association with individual information of the digital connection-type pad. These parameters are maintained also for a period in which the power is off.

Then, in a case in which change of the parameters stored in this digital pad assignment table 24*a* is performed by the user, parameters after change are transmitted to the digital connection-type pad of the parameters. In this way, change of parameters relating to an operation of a digital connection-type pad can be performed using the sound source device 11, and the change can be reflected in the digital connection-type pad.

In addition, in a case in which it is detected that a digital connection-type pad has been connected to one USB connector, in a case in which it is determined that assignment port identification information and parameters are stored in association with individual information of the digital connection-type pad, parameters stored in the digital pad assignment table 24*a* are transmitted to the digital connection-type pad. Accordingly, in a case in which the digital connection-type pad of which parameters have been changed in the sound source device 11 is connected to the sound source device 11 again, the digital connection-type pad can be operated using the changed parameters.

As above, while the present invention has been described on the basis of the embodiments, the present invention is not limited to the embodiments described above at all, and it can be easily assumed that various changes and modifications can be performed within a range not departing from the concept of the present invention. For example, each embodiment may be configured by changing the embodiment by adding a part or a plurality of parts of components included in other embodiments to the embodiment, replacing a part or a plurality of parts of the components of the embodiment with a part or a plurality of parts of the components of other embodiments, or the like including modified examples to be described below. In addition, numerical values taken in the embodiments described above are one example, and it is natural to employ different numerical values.

For example, in the embodiment described above, although a case in which three USB connectors are disposed in the USB interface 27 has been described, the number of USB connectors may be an arbitrary number. In addition, although a case in which the digital pad assignment table 24*a* stores information such as virtual input ports assigned to a maximum of 14 digital connection-type pads has been described, the number of digital connection-type pads that can be stored in the digital pad assignment table 24*a* may be an arbitrary number. In addition, it is preferable that the number of digital connection-type pads that can be stored in the digital pad assignment table 24*a* should be equal to or larger than the number of USB connectors disposed in the USB interface 27.

In the embodiment described above, a case in which the identification information 52*a* including model information and type information is stored in the digital connection-type pad, and the sound source device 11 selects a virtual input port that is appropriate for this digital connection-type pad on the basis of the model information and the type information included in the identification information 52*a* acquired from the digital connection-type pad has been described. In contrast to this, the sound source device 11 may select a virtual input port that is appropriate for the digital connection-type pad by using any one of the model information and the type information. In a case in which the type information of the digital connection-type pad is known, an appropriate virtual input port can be determined using only the type information. In addition, by storing information of a virtual input port that is appropriate for a model in advance in the ROM 22 of the sound source device 11 for each model of the digital connection-type pad, a virtual input port that is appropriate for the digital connection-type pad can be determined using only the model information of the digital connection-type pad. In addition, in accordance with this modified example, in the digital connection-type pad, information included in the identification information 52*a* may be limited to any one of the model information and the type information.

In addition, in the identification information 52*a* of the digital connection-type pad, in addition to the model information and the type information or instead of the model information and the type information, information representing a type of input port that is appropriate for the digital connection-type pad may be included, and the sound source device 11 may select a virtual input port that is appropriate for the digital connection-type pad on the basis of the information representing a type of input port that is appropriate for the digital connection-type pad included in the identification information 52*a* acquired from the digital connection-type pad.

In the embodiment described above, in the pad assignment process executed by the CPU 21 disposed inside the sound source device 11, in a case in which there is an assignment target pad registered in the digital pad assignment table 24*a* in advance (S15: Yes), a case in which a virtual input port identified using the assignment port identification information of the digital pad assignment table 24*a* is assigned (S17) has been described. Here, in the process of S15, in a case in which there are a plurality of assignment target pads registered in the digital pad assignment table 24*a*, it may be determined whether or not there is a duplicate between virtual input ports identified using the assignment port identification information of the digital pad assignment table 24*a* in each assignment target pad, and, in a case in which there is a duplicate, a virtual input port that is manually selected by the user may be assigned to at least one of the assignment target pads. More specifically, similar to the process of S33 of the pad registration process (see FIG. 7), a port type of a virtual input port to which a digital connection-type pad has not been assigned at that time point is presented to a user by displaying the port type on the LCD 25, and the user is prompted to select a port type to be assigned among the presented port types. Then, a virtual input port of a port type that is selected by a user by operating the operator 26 is assigned to the assignment target pad. In this way, assignment of the same virtual input port to different pads can be inhibited. In addition, assignment port identification information used for identifying the port type selected by the user here may be stored through overwriting in the assignment port area 24*a*3 of the digital pad assignment table 24*a* in association with an index number with which the assignment target pad is associated. In this way, thereafter, a virtual input port of a port type selected by the user can be assigned to the assignment target pad.

In the embodiment described above, in a case in which assignment port identification information for one digital connection-type pad is registered in the assignment port area 24*a*3 of the digital pad assignment table 24*a*, a virtual input port identified using the assignment port identification information may be arbitrarily changed to another virtual input port by the user. Then, assignment port identification information used for identifying a virtual input port after change may be stored in the assignment port area 24*a*3 through overwriting in association with an index number in which information of the one digital connection-type pad is stored. Accordingly, a virtual input port assigned to the digital connection-type pad in accordance with connection to the sound source device 11 can be freely changed by a user.

In the embodiment described above, although an application of the present invention to the sound source device 11 used for an electronic drum system using a pad that detects a beat has been described, the application is not limited thereto. The present invention, for example, can be applied to an electronic musical instrument main body device configuring an electronic musical instrument system by being connected with a playing operation device (for example, an electronic piano, an electronic guitar, or the like) generating playing information.

What is claimed is:

1. A sound source device for an electronic musical instrument, comprising:

at least one first kind of connection terminal to which a first playing operation device outputting a first playing information using a digital signal is connected and which are connected with any one of a plurality types of first playing operation devices;

a plurality of second kind of connection terminals to which a second playing operation device outputting a second playing information using an analog signal is connected and which are disposed for each type of a plurality types of second playing operation devices, and a musical sound generating unit that generates a first musical sound signal on the basis of the first playing information outputted from the first playing operation device connected to the first kind of connection terminal, and generates a second musical sound signal on the basis of the second playing information outputted from the second playing operation device connected to the second kind of connection terminals, respectively.

2. The sound source device for the electronic musical instrument according to claim 1, wherein the musical sound generating unit generates a third musical sound signal on the basis of the first playing information outputted from the first playing operation device connected to the first kind of connection terminal and the second playing information outputted from the second playing operation device connected to the second kind of connection terminals.

3. The sound source device for the electronic musical instrument according to claim 1, wherein the musical sound generating unit generates the second musical sound signal on the basis of the second playing information outputted from the second playing operation device connected to the second kind of connection terminals in a case in which another first playing operation device of the same type as the type of the second playing operation device is not connected to any one of the first kind of connection terminal, and does not generate the second musical sound signal based on the second playing information outputted from the second playing operation in a case in which the another first playing operation device of the same type is connected to any one of the first kind of connection terminal.

4. The sound source device for the electronic musical instrument according to claim 1, further comprising a notification unit that performs predetermined notification in a case in which the another first playing operation device of the same type as the type of the second playing operation device is connected to any one of the first kind of connection terminal when a timing to generate the second musical sound signal is determined on the basis of the second playing information outputted from the second playing operation device.

5. The sound source device for the electronic musical instrument according to claim 1, wherein the musical sound generating unit does not generate the second musical sound signal based on the second playing information outputted from the second playing operation device by turning off the second kind of connection terminals.

6. The sound source device for the electronic musical instrument according to claim 1, wherein the playing operation devices includes a pad that detects a beat.

7. The sound source device for the electronic musical instrument according to claim 1, wherein the playing operation devices includes an electronic piano.

8. The sound source device for the electronic musical instrument according to claim 1, wherein the playing operation devices includes an electronic guitar.

9. A sound source device for an electronic musical instrument, comprising:

at least one first kind of connection terminal to which a first playing operation device outputting a first playing information using a digital signal is connected and which are connected with any one of a plurality types of first playing operation devices; and a musical sound generating unit that generates a first musical sound signal on the basis of the first playing information outputted from the first playing operation device connected to the first kind of connection terminal in a case in which another first playing operation device of the same type as the type of the first playing operation device is not connected to another first kind of connection terminal, and does not generate the first musical sound signal based on the first playing information outputted from the first playing operation device in a case in which the another first playing operation device of the same type is connected to the another first kind of connection terminal.

10. A musical sound generating method, generating a musical sound in a sound source device for an electronic musical instrument, the musical sound generating method comprising:

providing at least one first kind of connection terminal to which a first playing operation device outputting a first playing information using a digital signal is connected and which are connected with any one of a plurality types of first playing operation devices;

providing a plurality of second kind of connection terminals to which a second playing operation device outputting a second playing information using an analog signal is connected and which are disposed for each type of a plurality types of second playing operation devices; and generating a first musical sound signal on the basis of the first playing information outputted from the first playing operation device connected to the first kind of connection terminal, and generating a second musical sound signal on the basis of the second playing information outputted from the second playing operation device connected to the second kind of connection terminals, respectively.

11. The musical sound generating method according to claim 10, further comprising:

generating a third musical sound signal on the basis of the first playing information outputted from the first playing operation device connected to the first kind of connection terminal and the second playing information outputted from the second playing operation device connected to the second kind of connection terminals.

12. The musical sound generating method according to claim 10, further comprising:

generating the second musical sound signal on the basis of the second playing information outputted from the second playing operation device connected to the second kind of connection terminals in a case in which another first playing operation device of the same type as the type of the second playing operation device is not connected to any one of the first kind of connection terminal, and not generating the second musical sound signal based on the second playing information outputted from the second playing operation device in a case in which the another first playing operation device of the same type is connected to any one of the first kind of connection terminal.

13. The musical sound generating method according to claim 10, further comprising:

performing predetermined notification in a case in which the another first playing operation device of the same type as the type of the second playing operation device is connected to any one of the first kind of connection terminal when a timing to generate the second musical sound signal is determined on the basis of the second playing information outputted from the second playing operation device.

14. The musical sound generating method according to claim 10, further comprising:

not generating the second musical sound signal based on the second playing information outputted from the second playing operation device by turning off the second kind of connection terminals.

15. The musical sound generating method according to claim 10, wherein the playing operation devices includes a pad that detects a beat.

16. The musical sound generating method according to claim 10, wherein the playing operation devices includes an electronic piano.

17. The musical sound generating method according to claim 10, wherein the playing operation devices includes an electronic guitar.

18. A musical sound generating method, generating a musical sound in a sound source device for an electronic musical instrument, the musical sound generating method comprising:

providing at least one first kind of connection terminal to which a first playing operation device outputting a first playing information using a digital signal is connected and which are connected with any one of a plurality types of first playing operation devices; and generating a first musical sound signal on the basis of the first playing information outputted from the first playing operation device connected to the first kind of connection terminal in a case in which another first playing operation device of the same type as the type of the first playing operation device is not connected to another first kind of connection terminal, and not generating the first musical sound signal based on the first playing information outputted from the first playing operation device in a case in which the another first playing operation device of the same type is connected to the another first kind of connection terminal.

19. An electronic musical instrument system comprising:

a playing operation device that generates a playing information; and a sound source device for an electronic musical instrument, wherein the sound source device for the electronic musical instrument includes:

at least one first kind of connection terminal to which a first playing operation device outputting a first playing information using a digital signal is connected and which are connected with any one of a plurality types of first playing operation devices;

a plurality of second kind of connection terminals to which a second playing operation device outputting a second playing information using an analog signal is connected and which are disposed for each type of a plurality types of second playing operation devices; and a musical sound generating unit that generates a first musical sound signal on the basis of the first playing information outputted from the first playing operation device connected to the first kind of connection terminal, and generates a second musical sound signal on the basis of the second playing information outputted from the second playing operation device connected to the second kind of connection terminals, respectively.

20. The electronic musical instrument system according to claim 19, wherein the musical sound generating unit generates a third musical sound signal on the basis of the first playing information outputted from the first playing operation device connected to the first kind of connection terminal and the second playing information outputted from the second playing operation device connected to the second kind of connection terminals.

* * * * *